(12) United States Patent
Caron et al.

(10) Patent No.: US 9,292,014 B2
(45) Date of Patent: Mar. 22, 2016

(54) DIGITAL CONTROL MANAGER

(71) Applicants: Simon Caron, Montreal (CA); Hami Monsarrat-Chanon, Montreal (CA)

(72) Inventors: Simon Caron, Montreal (CA); Hami Monsarrat-Chanon, Montreal (CA)

(73) Assignee: Schneider Electric Buildings, LLC, Palatine, IL (US)

( * ) Notice: Subject to any disclaimer, the term of this patent is extended or adjusted under 35 U.S.C. 154(b) by 0 days.

(21) Appl. No.: 14/067,088

(22) Filed: Oct. 30, 2013

(65) Prior Publication Data

US 2014/0288713 A1    Sep. 25, 2014

Related U.S. Application Data

(63) Continuation of application No. 12/889,320, filed on Sep. 23, 2010, now abandoned.

(60) Provisional application No. 61/272,424, filed on Sep. 23, 2009.

(51) Int. Cl.
*G06F 19/00* (2011.01)
*G05B 19/042* (2006.01)
*G05B 15/02* (2006.01)

(52) U.S. Cl.
CPC .............. *G05B 19/042* (2013.01); *G05B 15/02* (2013.01); *G05B 2219/2642* (2013.01); *G05B 2219/31131* (2013.01); *G05B 2219/31161* (2013.01)

(58) Field of Classification Search
CPC ................. G05B 19/042; G05B 15/02; G05B 2219/31131; G05B 2219/2642; G05B 2219/2219; G05B 2219/31161

USPC ............... 700/19, 275, 276; 455/420, 423
See application file for complete search history.

(56) References Cited

U.S. PATENT DOCUMENTS

| | | | | |
|---|---|---|---|---|
| 7,664,573 | B2 * | 2/2010 | Ahmed | 700/276 |
| 7,860,495 | B2 * | 12/2010 | McFarland | 455/420 |
| 8,155,664 | B2 * | 4/2012 | Mcfarland | 455/456.1 |
| 2005/0154494 | A1 * | 7/2005 | Ahmed | 700/275 |
| 2006/0028997 | A1 * | 2/2006 | McFarland | 370/252 |
| 2006/0063522 | A1 * | 3/2006 | McFarland | 455/423 |
| 2006/0063523 | A1 * | 3/2006 | McFarland | 455/423 |
| 2008/0242314 | A1 * | 10/2008 | McFarland | 455/456.1 |
| 2009/0315485 | A1 * | 12/2009 | Verfuerth et al. | 315/320 |

* cited by examiner

*Primary Examiner* — Michael D Masinick
(74) *Attorney, Agent, or Firm* — Nixon Peabody LLP

(57) ABSTRACT

Embodiments of the invention provide a digital control manager comprising a first transceiver configured to provide one or more wireless communication links to one or more energy autonomous end devices; a second transceiver configured to provide one or more wireless communication links to one or more digital control managers and one or more end devices; a local database; an intellectualize function module configured to execute a computer program to provide intelligence to the digital control manager and to end devices in communication therewith. A digital control manager system comprises a network of communication links between the digital control managers to enable data exchange between the digital control managers; a plurality of end devices, wherein each end device is in communication with at least one digital control manager by a communication link to enable data exchange between the end device and the at least one digital control manager, and at least one distributed database comprising a copy of the objects of the local databases of at least some of the digital control managers.

20 Claims, 20 Drawing Sheets

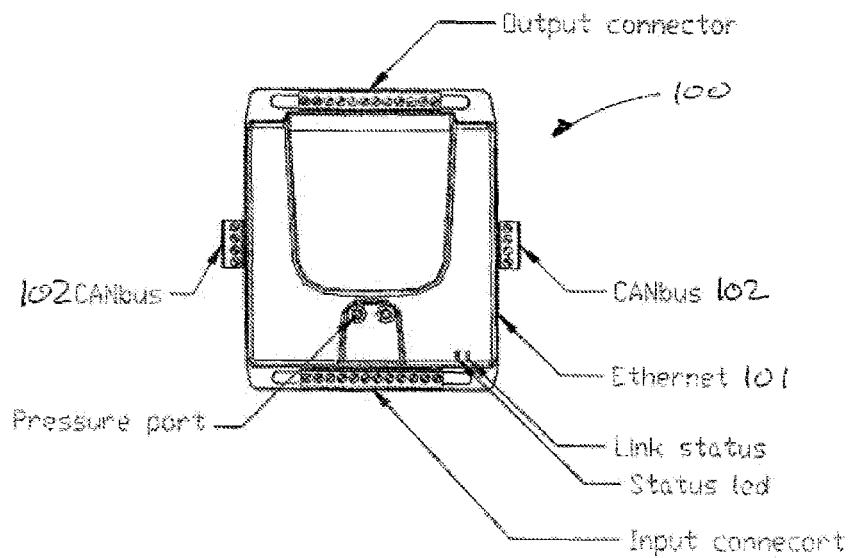
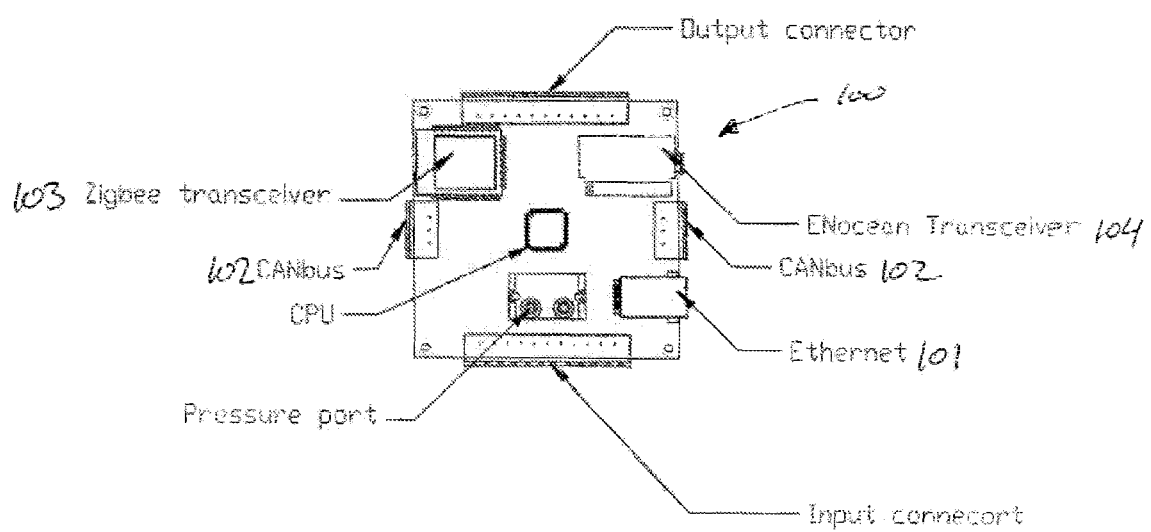
Figure 10

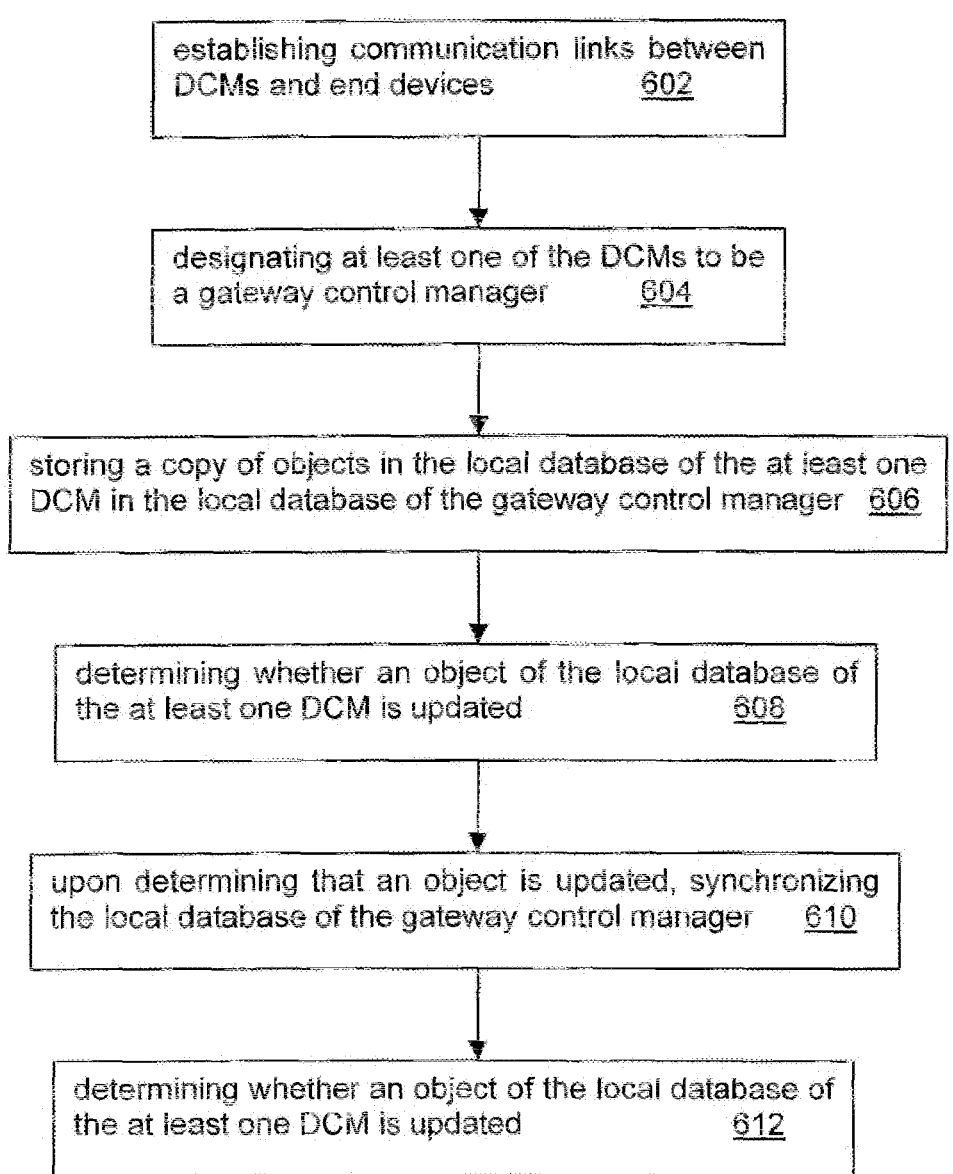

```
                    ← 600

┌─────────────────────────────────────┐
│ establishing communication links    │
│ between DCMs and end devices    602 │
└─────────────────────────────────────┘
                    │
                    ▼
┌─────────────────────────────────────┐
│ designating at least one of the DCMs│
│ to be a gateway control manager 604 │
└─────────────────────────────────────┘
                    │
                    ▼
┌─────────────────────────────────────────┐
│ storing a copy of objects in the local  │
│ database of the at least one DCM in the │
│ local database of the gateway control   │
│ manager                            606  │
└─────────────────────────────────────────┘
                    │
                    ▼
┌─────────────────────────────────────────┐
│ determining whether an object of the    │
│ local database of the at least one DCM  │
│ is updated                         608  │
└─────────────────────────────────────────┘
                    │
                    ▼
┌─────────────────────────────────────────┐
│ upon determining that an object is      │
│ updated, synchronizing the local        │
│ database of the gateway control manager │
│                                    610  │
└─────────────────────────────────────────┘
                    │
                    ▼
┌─────────────────────────────────────────┐
│ determining whether an object of the    │
│ local database of the at least one DCM  │
│ is updated                         612  │
└─────────────────────────────────────────┘
```

Figure 16

DIGITAL CONTROL MANAGER

CROSS REFERENCE TO RELATED APPLICATIONS

This Application is a continuation of U.S. application Ser. No. 12/889,320, filed Sep. 23, 2010, which claims priority on U.S. Provisional Patent Application No. 61/272,424, filed on Sep. 23, 2009, which is herein incorporated by reference.

TECHNICAL FIELD

The present invention relates to a digital control manager and systems and methods associated therewith.

BACKGROUND

A building automation system (BAS) is a control system for a building. The control system is a computerized network of controllers designed to monitor and control end devices that make up the mechanical and lighting systems in a building. For example, a BAS keeps the building climate within a specified range, provides lighting based on an occupancy schedule, and monitors system performance and device failures. BAS networks may consist of a bus which connects controllers with input/output devices, and a user interface for data communication. Typically, controllers are purpose-built computers with input and output capabilities. Inputs allow a controller to read temperatures, humidity, pressure, current flow, and airflow. Outputs allow the controller to send command and control signals to other parts of the BAS.

There exists a need to provide an improved controller, or at least provide an alternative. There further exists a need to provide an improved database management method for a network of controllers, or at least an alternative. Finally, there exists a need to provide an improved method for managing a local database of a controller, or at least provide an alternative.

SUMMARY

In a first aspect, some embodiments of the present invention provide a digital control manager comprising:
 a first transceiver configured to provide one or more wireless communication links to one or more energy autonomous end devices;
 a second transceiver configured to provide one or more wireless communication links to one or more digital control managers;
 a local database; and
 an intellectualize function module configured to execute a computer program to provide intelligence to the digital control manager and to end devices in communication therewith.

Embodiments of the present invention provide a digital control manager further comprising an Ethernet interface configured to provide one or more wired communication links and one or more wireless communications links to one or more digital control managers and one or more end devices.

Embodiments of the present invention provide a digital control manager further comprising a WiFi transceiver to provide one or more wireless communications links to one or more digital control managers and one or more end devices.

Embodiments of the present invention provide a digital control manager further comprising a sharing kernel configured to manage the local database.

Embodiments of the present invention provide an embedded software interface to configure and monitor the digital control manager and end devices in communication therewith.

In another aspect, some embodiments of the present invention provide a digital control manager system comprising:
 a plurality of digital control managers comprising a communication interface and a local database;
 a network of communication links between the digital control managers to enable data exchange between the digital control managers;
 a plurality of end devices, wherein each end device is in communication with at least one digital control manager by a communication link to enable data exchange between the end device and the at least one digital control manager; and
 at least one distributed database comprising a copy of the objects of the local databases of at least some of the digital control managers.

Embodiments of the present invention provide a digital control manager system wherein the plurality of digital control managers further comprises at least one gateway control manager, wherein the at least one gateway control manager is configured to communicate with an external device to provide access to the local database of the at least one gateway control manager, wherein the local database of the at least one gateway control manager comprises a copy of the objects of the local database of at least one other digital control manager.

Embodiments of the present invention provide the digital control manager system wherein the plurality of digital control managers further comprises a first gateway control manager, wherein the local database of the first gateway control manager comprises a copy of the objects of the local database of at least one other digital control manager; wherein the plurality of digital control managers further comprises a second gateway control manager, wherein the local database of the second gateway control manager comprises a copy of the objects of the local database of at least one other digital control manager, wherein the first gateway control manager is configured to communicate with the second gateway control manager and is configured to provide the second gateway controller with a copy of the objects of the local database of the first gateway control manager; wherein the first gateway control manager is configured to communicate with an external device and provide the external device with a copy of the objects of the local database of the first gateway control manager and wherein the second gateway control manager is configured to communicate with an external device and provide the external device with the copy of the objects of the local database of the first gateway control manager and a copy of the objects of the local database of the second gateway control manager.

In another aspect, embodiments of the present invention provide a database management method for a low bit rate communication network comprising:
 establishing communication links between a plurality of digital control managers and a plurality of end devices, wherein each digital control manager comprises a local database of objects;
 designating at least one of the digital control managers to be a gateway control manager;
 for at least one digital control manager, storing a copy of the objects of the local database of the at least one digital control manager in the local database of the gateway control manager;
 determining whether an object of the local database of the at least one digital control manager is updated;

upon determining that an object is updated, synchronizing the local database of the gateway control manager by making a corresponding update to the copy of the object that was updated.

Embodiments of the present invention provide a database management method further comprising:
- establishing a communication link between the gateway control manager and a web browser;
- receiving a data request from the web browser at the gateway control manager;
- providing the web browser with access to the local database of the gateway control manager.

Embodiments of the present invention provide a database management method wherein providing access comprises exporting a copy of the local database of the gateway control manager to the web browser.

Embodiments of the present invention provide a database management method further comprising:
- establishing a communication link between the gateway control manager and a web browser;
- receiving a synchronization request from the web browser at the gateway control manager, wherein the synchronization request identifies one or more digital control managers;
- determining whether an object of the local database of the one or more digital control managers is updated; and
- upon determining that an object is updated, synchronizing the local database of the gateway control manager by making a corresponding update to the copy of the object that was updated.

Embodiments of the present invention provide a database management method further comprising:
- establishing a communication link between the gateway control manager and a web browser;
- establishing a communication link between an end device and a digital control manager, wherein the local database of the digital control manager stores objects corresponding to a state of the end device;
- storing a copy of the objects corresponding to the state of the end device of the local database of the at least one digital control manager in the local database of the gateway control manager;
- receiving a state request from the web browser, wherein the state request identifies the end device;
- providing the web browser with access to the copy of the objects corresponding to the state of the end device in the local database of the gateway control manager.

In another aspect, embodiments of the present invention provide a database management method for a low bit rate communication network comprising:
- establishing communication links between a plurality of digital control managers and a plurality of end devices, wherein each digital control manager comprises a local database;
- designating one of the digital control managers to be a first gateway control manager,
- designating one of the digital control managers to be a second gateway control manager;
- for at least one digital control manager, storing a copy of the objects of the local database of the at least one digital control manager in the local database of the first gateway control manager;
- for at least one other digital control manager, storing a copy of the objects of the local database of the at least one other digital control manager in the local database of the second gateway control manager;
- storing a copy of the objects of the local database of the first gateway control manager in the local database of the second gateway control manager;
- determining whether an object of the local database of the at least one digital control manager is updated;
- upon determining that an object is updated, synchronizing the local database of the first gateway control manager by making a corresponding update to the copy of the object that was updated,
- determining whether an object of the local database of the first gateway control manager is updated; and
- upon determining that an object is updated, synchronizing the local database of the second gateway control manager by making a corresponding update to the copy of the object that was updated.

In a further aspect, embodiments of the present invention provide a digital control manager comprising:
- at least one communication interface configured to provide a communication link to one or more digital control managers, one or more end devices, and a web browser;
- a local database comprising objects; and
- an embedded software interface to configure and monitor the digital control manager and end devices in communication therewith.

In a further aspect, embodiments of the present invention provide a method for synchronizing a local database comprising:
- providing at least one digital control manager;
- establishing a communication link between the digital control manager and a web browser running on a computing device;
- executing the embedded software interface in the web browser; and
- exporting a copy of the objects of the local database of the digital control manager to the web browser.

Embodiments of the present invention provide a method for synchronizing a local database further comprising:
- establishing communication links between a plurality of digital control managers;
- designating at least one of the digital control managers to be a gateway control manager;
- for at least one digital control manager, storing a copy of the objects of the local database of the at least one digital control manager in the local database of the gateway control manager;
- establishing a communication link between the gateway control manager and the web browser running on the computing device;
- at the gateway control manager, receiving, a data retrieval request from the web browser identifying the at least one digital control manager;
- exporting a copy of the objects from the local database of the gateway control manager to the web browser.

Embodiments of the present invention provide a method for synchronizing a local database wherein the exporting the copy of the objects from the local database of the gateway control manager to the web browser uses a cross-site HTTP request.

Embodiments of the present invention provide a method for synchronizing a local database further comprising:
- providing the embedded software interface in the memory of the gateway control manager;
- exporting a copy of the web interface application and a copy of the local database of the gateway control manager to the computing device running the web browser;

terminating the communication link between the gateway control manager and the web browser running on the computing device;

deleting the copy of the embedded software interface and the copy of the local database of the gateway control manager on the computing device running the web browser.

Embodiments of the present invention provide a digital control manager further comprising a communication function module configured to convert from a plurality of protocols to a plurality of protocols using corresponding protocol stacks and drivers.

Embodiments of the present invention provide a digital control manager further comprising a control function module configured to manage input and output interfaces and further configured to control physical parameters through a set of control strategies.

Embodiments of the present invention provide a digital control manager further comprising a sharing kernel configured to provide a common data exchange scheme to link components of the digital control manager via communication channels.

Embodiments of the present invention provide a digital control manager wherein the at least one communication interface comprises a first transceiver configured to provide one or more wireless communication links to one or more end devices having no active power source.

Embodiments of the present invention provide a digital control manager wherein the at least one communication interface comprises a second transceiver configured to provide one or more wireless communication links to one or more digital control managers and one or more end devices;

Embodiments of the present invention provide a digital control manager further comprising an intellectualize function module configured to execute a computer program to provide intelligence to the digital control manager and to end devices in communication therewith.

Embodiments of the present invention provide a digital control manager further comprising an Ethernet interface configured to provide one or more wired communication links and one or more wireless communications links to one or more digital control managers and one or more end devices.

Embodiments of the present invention provide a digital control manager further comprising an WiFi transceiver to provide one or more wireless communications links to one or more digital control managers and one or more end devices.

Embodiments of the present invention provide a digital control manager further comprising a sharing kernel configured to manage the local database.

Embodiments of the present invention provide a digital control manager further comprising a communication function module configured to provide an interface for converting from a plurality of protocols to a plurality of protocols using corresponding protocol stacks and drivers Embodiments of the present invention provide a digital control manager further comprising a control function module configured to manage input and output interfaces and further configured to control physical parameters through a set of control strategies.

Embodiments of the present invention provide a digital control manager further comprising a sharing kernel configured to provide a common data exchange scheme to link components of the digital control manager via communication channels.

Embodiments of the present invention provide a digital control manager system wherein the data exchange between digital control managers is based on an observer scheme and uses network objects and network nodes.

Embodiments of the present invention provide a building automation system comprising:
  a plurality of digital control managers in a building, wherein the plurality of digital control managers are grouped into clusters, wherein each cluster is configured to manage a segment of a building,
  a network of communication links between the digital control managers to enable data exchange between the digital control managers;
  a plurality of end devices in the building, wherein each end device is in communication with at least one digital control manager by a communication link to enable the at least one digital control manager to control and monitor the end device; and
  at least one distributed database comprising copies of the objects of the local databases of at least some of the digital control managers.

Embodiments of the present invention provide a method of building automation comprising:
  providing a plurality of digital control managers in a building to monitor and control a plurality of end devices, each digital control manager comprising a memory storing a local database;
  establishing a communication link between each end device and a digital control manager;
  establishing communication links between the plurality of digital control managers to form a self healing mesh network;
  providing a distributed database comprising copies of objects of the local memories of the plurality of digital controllers.

Embodiments of the present invention provide a building automation system comprising a self healing mesh network of a multitude of autonomous wireless digital control managers, wherein the each digital control manager comprises a wireless communication interface and a control module to control one or more devices; and a distributed database comprising data for all of the controlled devices in a building.

Embodiments of the present invention provide a system in which controlled device commands are enacted via updates to the distributed database.

Embodiments of the present invention provide a system wherein any digital control manager having network access outside the self healing mesh network will act as a gateway control managers within the self healing mesh network.

Embodiments of the present invention provide a system wherein the entirety of the contents of the distributed database of the self healing mesh network is exported to any authorized remote computer that logs into the gateway control managers.

Embodiments of the present invention provide a system further comprising an application on a remote computer, wherein the application is configured to update its local database and such updates are then redistributed automatically back to the gateway control manager and digital control managers in the mesh network.

Embodiments of the present invention provide a system in which individual digital control managers make any necessary changes in the controlled devices to cause the controlled devices to match the state of the databases.

Embodiments of the present invention provide a system wherein a gateway control manager contains a browser application which is exported to any authorized computer that logs into the gateway controller along with a copy of all of the individual digital control managers databases in the mesh network.

Embodiments of the present invention provide a system wherein the browser application exported from the gateway controller is used to control the building via database updates.

Embodiments of the present invention provide a digital control manager comprising an actuator and a sensor.

Embodiments of the present invention provide a digital control manager comprising a pressure sensor.

Embodiments of the present invention provide a building automation system comprising:
- a plurality of digital control managers, each digital control manager comprising two wireless transceivers operating at two different frequencies;
- a network of communication links between the plurality of digital control managers; and
- a plurality of end devices, each end device in communication with at least one digital control manager to enable the digital control manager to control and monitor the end device.

Embodiments of the present invention provide a digital control manager system wherein one or more digital control managers.

BRIEF DESCRIPTION OF THE DRAWINGS

Non-limitative illustrative embodiments of the invention will now be described by way of example only with reference to the accompanying drawings, in which:

FIG. 10 is a view of a DCM with its communication interfaces in accordance with an example embodiment;

FIG. 16 is a flowchart diagram of a database management method for a low bit rate communication network in accordance with an example embodiment;

Figure 1:
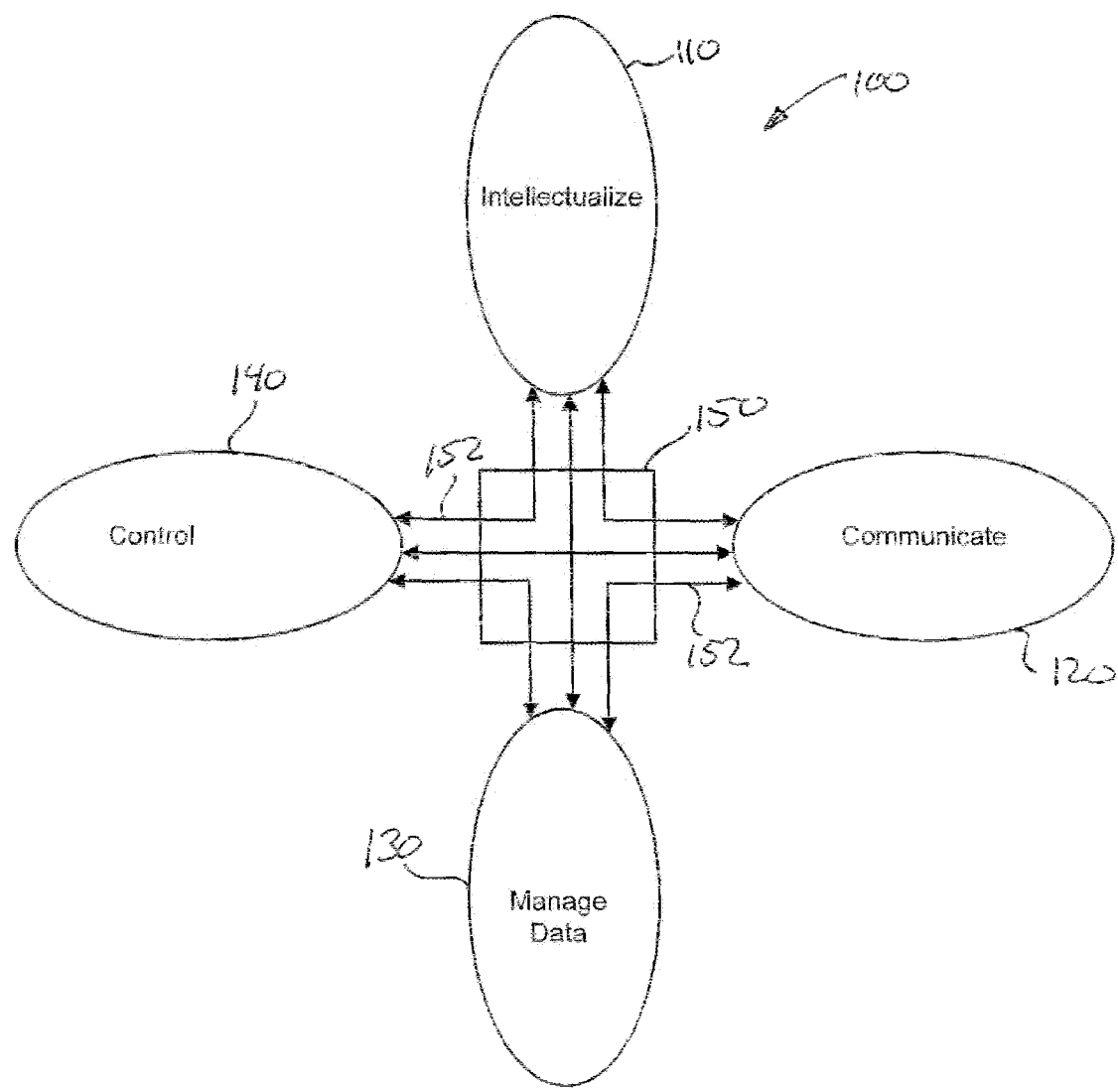
FIG. 1 is a schematic representation of the digital control manager (DCM) according to an example embodiment of the present invention.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. Example embodiments may be implemented in computer programs executing on programmable hardware devices each comprising at least one processor, a data storage system (including volatile and non-volatile memory and/or storage elements), and at least one communication interface. For example and without limitation, the programmable hardware devices may be a server, network appliance, set-top box, embedded device, computer expansion module, computer, laptop, personal data assistant, or mobile device. Program code is applied to input data to perform the functions described herein and generate output information. The output information may be applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette), readable by a general or special purpose programmable computer, for configuring and operating the computer when the storage media or device is read by the computer to perform the procedures described herein. The inventive system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Generally stated, a non-limitative illustrative embodiment of the present invention provides a digital control manager (DCM), which is an entity responsible for managing processes within an application. To some level, a controller must be "intelligent" in order to accomplish its tasks. The more intelligent the controller, the more effective it will be at solving problems or accomplishing tasks, specifically control tasks. In this regard, the DCM is required to perform functions which may be represented by four fundamental functions.

Intellectualize:
  to interpret;
  to solve;
  to adapt its way of interpreting; and
  to command.
Communicate:
  to exchange data with external components.
Manage Data:
  to maintain data (storage, validity); and
  to present data.
Control:
  interact with the physical world:
    a. retrieve information from the environment;
    b. perform physical actions; and
  implement command strategies.

Reference is first made to FIG. 1, which shows a schematic representation of a DCM 100 in accordance with an example embodiment. The DCM 100 comprises four function modules, namely the intellectualize function module 110, the communicate function module 120, the manage data function module 130 and the control function module 140. The DCM 100 implements a functions collaboration by providing a common high speed data exchange scheme, referred to as the sharing kernel 150, that link all of the functions modules via communication channels 152.

Intellectualize Function Module

Figure 2:
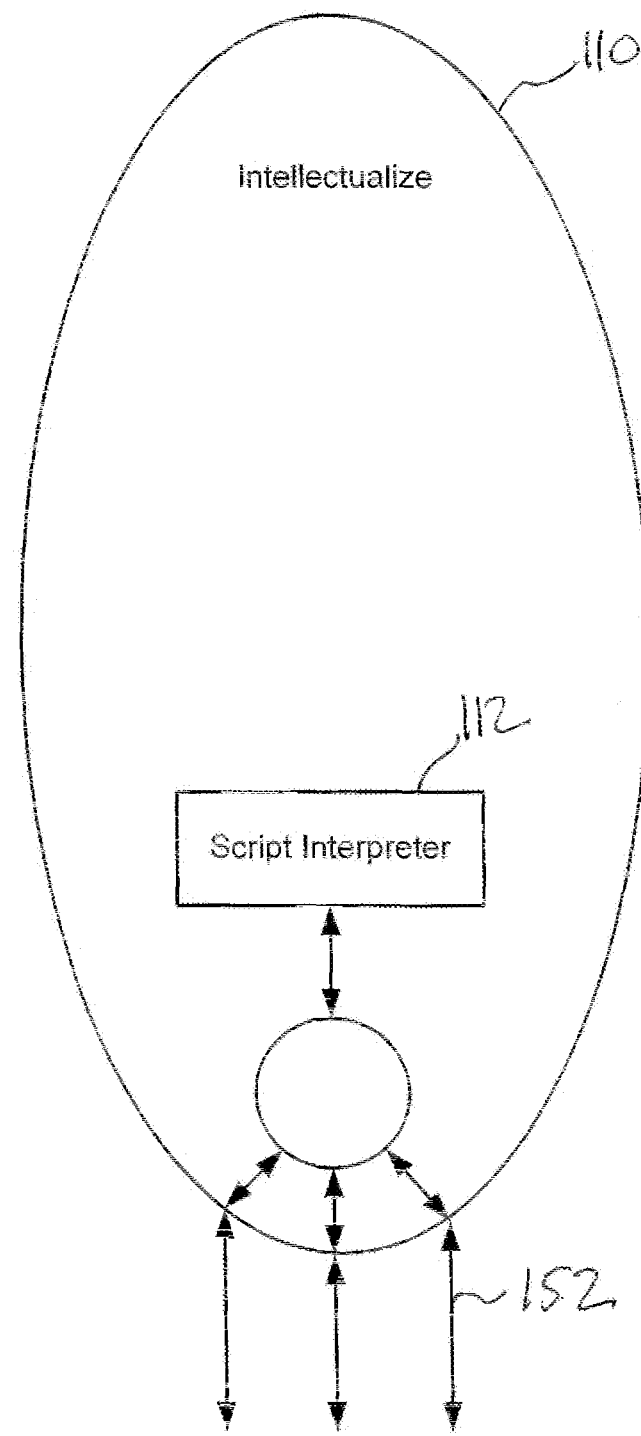
FIG. 2 is a schematic representation of the intellectualize function module of FIG. 1 in accordance with an example embodiment.

Referring now to FIG. 2, there is shown a schematic representation of the intellectualize function module 110 in accordance with an example embodiment. The intellectualize function module 110 analyzes data in order to decide what are to be the next commands and actions in both a discrete and continuous manner. For example, the intellectualize function module 110 may be configured to implement steps similar to the mental process that would go on in the head of a human control manager (HCM). This process can be described and embedded into the DCM 100 by a human operator.

For example, a discrete process where a HCM controls an ambient temperature may be described as follows:
  a. the HMC notices a strong wind in the late afternoon which announces a temperature drop; and
  b. the HMC starts a fire to keep a warm ambient temperature.

The same behavior can be scripted and placed on the DCM 100 by a human operator:
  a. the DCM notices a strong wind in the late afternoon which announces a temperature drop; and
  b. the DCM starts a fire to keep a warm ambient temperature.

In an illustrative example of the present invention, the DCM 100 accepts processes scripted in a modified version of the Lua language. Once embedded, a script interpreter 112 runs the scripts at user specified intervals. The behavior of the intellectualize function module 110 may be modified by providing its script interpreter 112 with a script, through the sharing kernel 150. This enables the DCM 100 to learn at the process level (i.e. it can dynamically change the way it processes information). It is to be understood that other scripting languages may also be used.

Communicate Function Module

Figure 3:
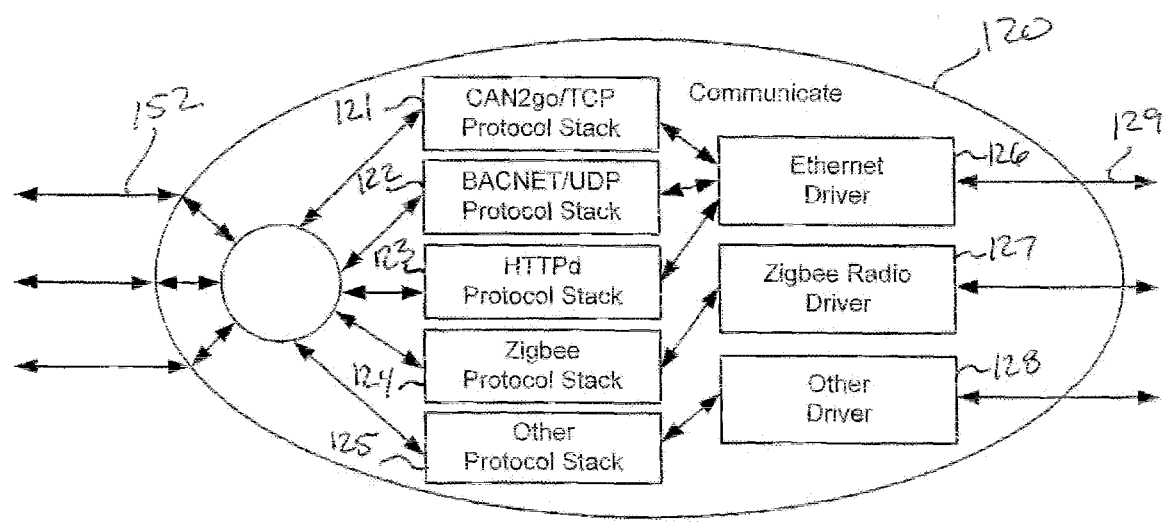
FIG. 3 is a schematic representation of the communicate function module of FIG. 1 in accordance with an example embodiment.

Referring now to FIG. 3, there is shown a schematic representation of the communicate function module 120 in accordance with an example embodiment. The communicate function module 120 may be seen as a communication protocol converter and executer. Instead of being a separate physical device, it is embedded within the DCM 100 and interacts with the other function modules (i.e. 110, 130 and 140) through the sharing kernel 150 via communication channels 152 and with the outside world through exterior communication channels 129. The communicate function module 120 may convert from a multiplicity of protocols to a multiplicity of other protocols using corresponding protocol stacks, such as for example: CAN2go/TCP Protocol Stack 121, BACNET/UDP Protocol Stack 122, HTTPd Protocol Stack 123, Zigbee/802.15.4 Protocol Stack 124, EnOcean Protocol Stack and Other Protocol 125 along with appropriate hardware/software drivers, such as for example Ethernet Driver 126, Zigbee/802.15.4 Radio Driver 127, EnOcean Radio Driver and Other Driver 128. It is to be understood that other protocol stacks and drivers may also be used.

Manage Data Function Module

Figure 4:
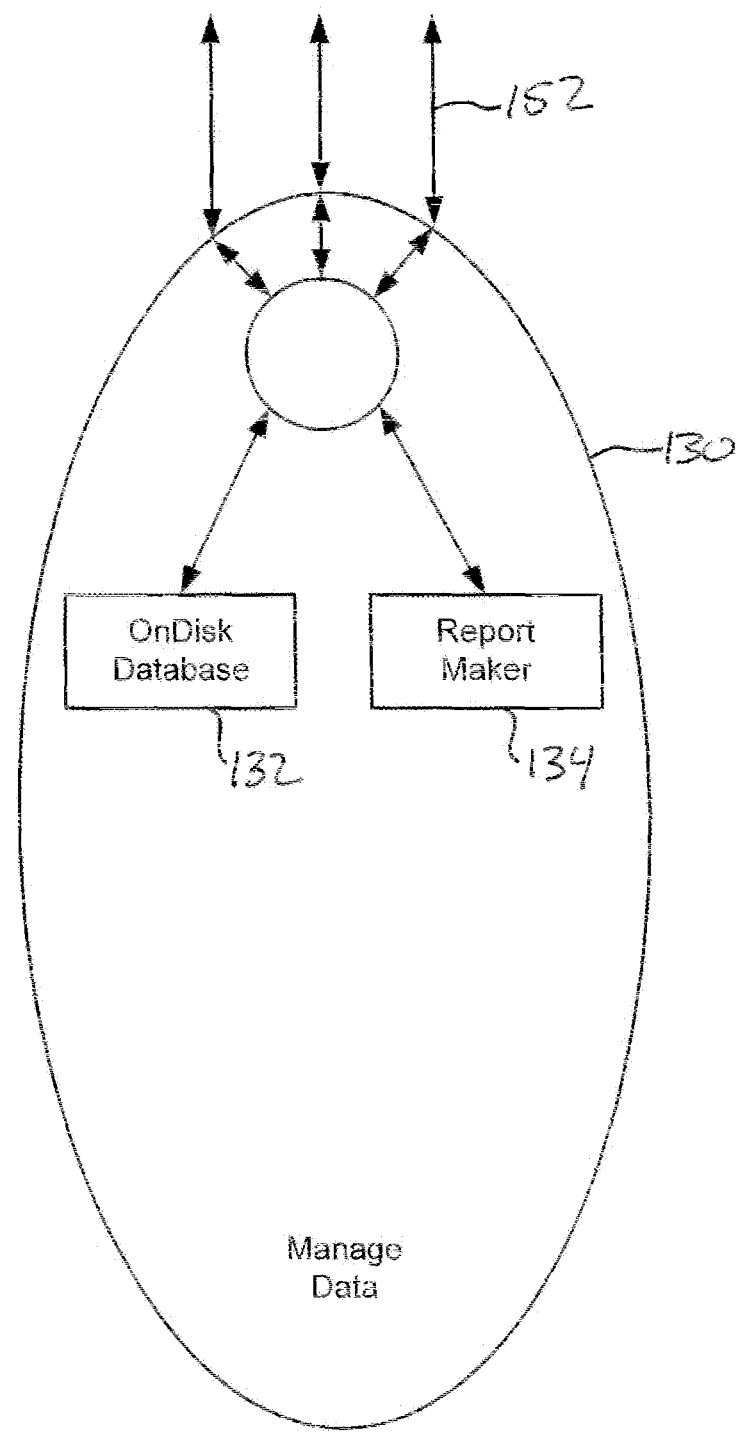
FIG. 4 is a schematic representation of the manage data function module of FIG. 1 in accordance with an example embodiment.
Figure 5:
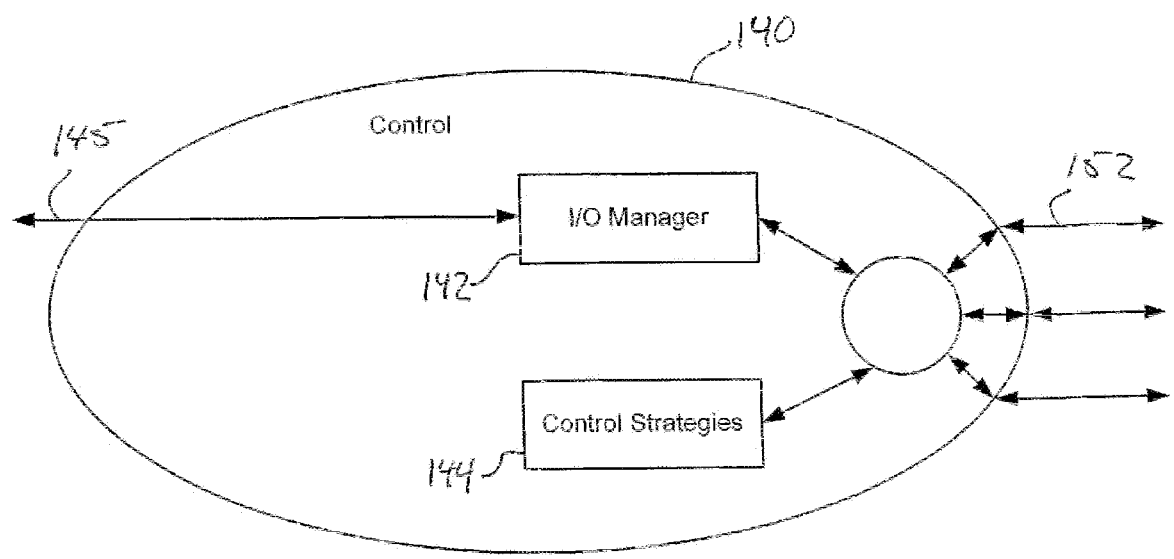
FIG. 5 is a schematic representation of the control function module of FIG. 1 in accordance with an example embodiment.

Referring now to FIG. 4, there is shown a schematic representation of a manage data function module 130 in accordance with an example embodiment. The manage data function module 130 is responsible for storing and managing data. It constitutes the memory of the DCM 100 through a local memory such as an OnDisk database 132, for example. It can filter or format the requested data in an effective way through, for example, a report maker 134. Those data are then available to the other modules (i.e. 110, 120 and 140) through the sharing kernel 150 via communication channels 152.

Control Function Module

Figure 6:
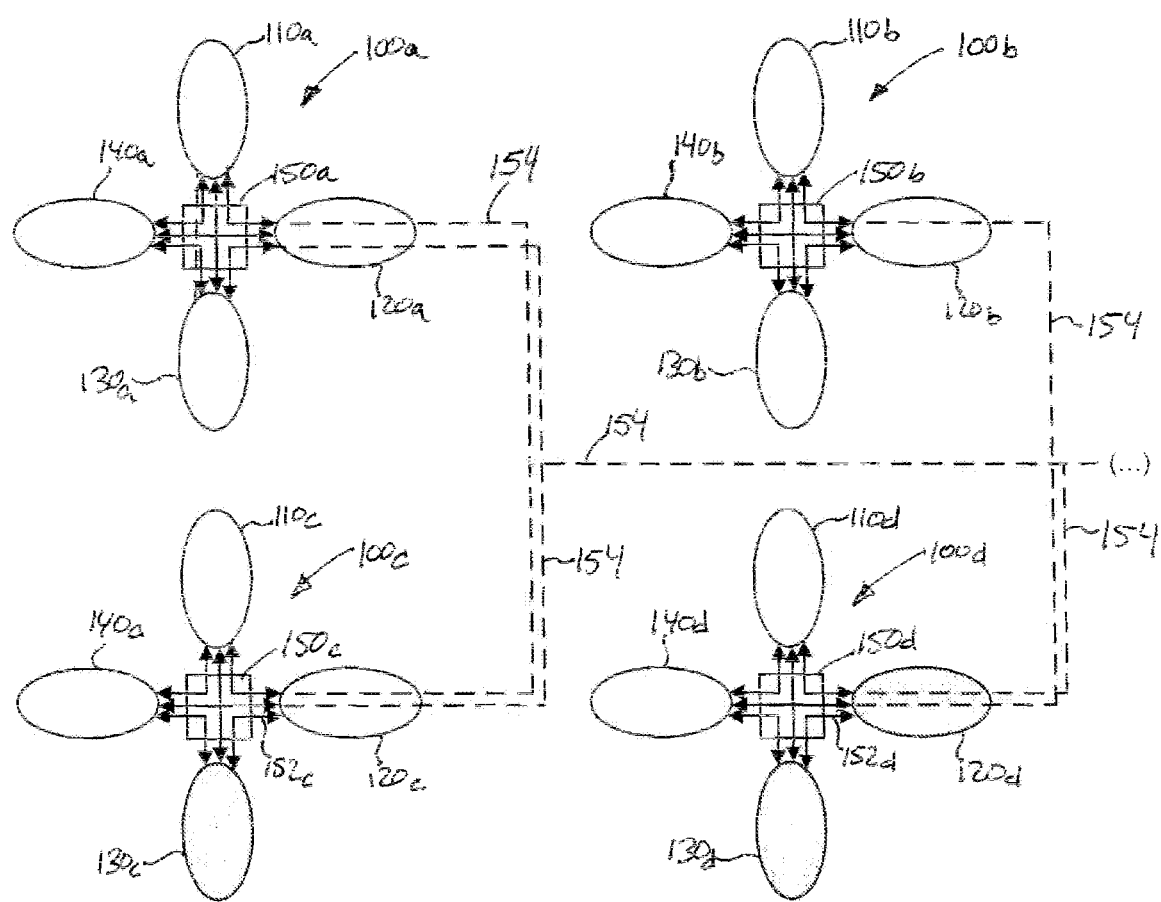
FIG. 6 is a schematic representation of a network of DCMs in accordance with an example embodiment.

Referring now to FIG. 6, there is shown a schematic representation of a control function module 140 in accordance with an example embodiment. The role of the control function module 140 is to allow the DCM 100 to have physical interaction with the outside world through a control channel 145. It manages, amongst other things, the input/output interfaces and any other electronic interfaces through an I/O manager 142. The control function module 140 is also responsible for the control of physical parameters via sets of control strategies 144 (e.g. PID sets, neural networks, etc.). The control function module 140 interacts with the other modules (i.e. 110, 120 and 130) through the sharing kernel 150 via communication channels 152.

Sharing Kernel

The main purpose of the sharing kernel 150 is to allow efficient data sharing between any internal function modules 110, 120, 130 and 140, through communication channels 152. The sharing kernel 150 further provides for data sharing between networked DCMs 100, through their respective communicate function modules 120. The sharing kernel 150 possesses a single generic interface through which it presents its functionalities and is multi-tasking so as to be able to do different parallel processing. It is passive and answers to client requests, allowing filtered search for information sharing efficiency.

Referring now to FIG. 6, there is shown a schematic representation of a network of DCMs in accordance with an example embodiment. The schematic representation is an example of four DCMs 100a, 100b, 100c and 100d networked together using their respective communicate function modules 120a, 120b, 120c and 120d, through network communication links 154 such as, for example, Ethernet links and wireless links.

DCM 100a comprises internal function modules 110a, 120a, 130a, 140a. DCM 100b comprises internal function modules 110b, 120b, 130b, 140b. DCM 100c comprises internal function modules 110c, 120c, 130c, 140c. DCM 100d comprises internal function modules 110d, 120d, 130d, 140d. All information exchange between internal function modules 110, 120, 130 and 140, and DCMs 100, are done via the use of network objects (NObj) and nodes (NNodes).

Figure 7:
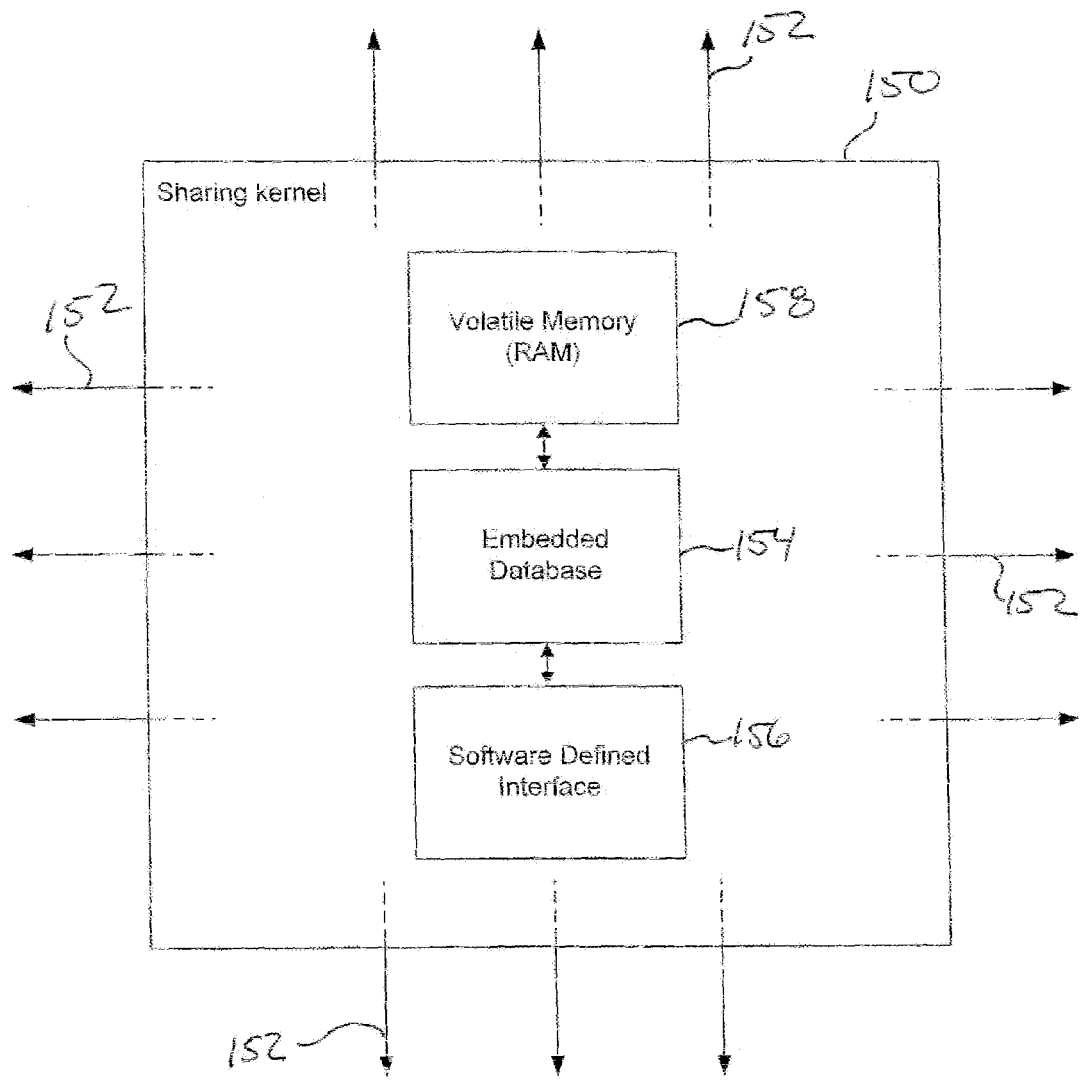
FIG. 7 is a schematic representation of the sharing kernel of FIG. 1 in accordance with an example embodiment.

Referring now to FIG. 7, there is shown a schematic representation of a sharing kernel 150 in accordance with an example embodiment The sharing kernel 150 is composed of a high performance embedded database 154 on which a software defined interface 156 has been added. In this example, data are managed in volatile memory 158 for maximum performance. Data are organized using two types of entries which are string identifier indexed trees (NNode and NObj entries which will be detailed further below). Search algorithms such as B-Tree and/or Patricia are used on during access to shared data in order to enhance the sharing process.

In the illustrative embodiment, the sharing kernel 150 manages only two types of entries which (NNode and NObj entries) is sufficient to manage effectively any type of intra-module 110, 120, 130 and 140 or network communication (i.e. between DCMs 100), via communication channels 152.

Network Object (NObj)

Information exchange between internal function modules 110, 120, 130 and 140, and network communication between DCMs 100, are done via the use of NObj, which is a form of network variable. In the illustrative embodiment of the present invention, the NObj is used to manage access to a variable associated with an internal process, such as function modules 110, 120, 130 and 140, as well as external process through any network. At the internal level, NObjs are accessed as database entries through the sharing kernel interface 156. The NObj may be seen as a network semaphore which has a defined content. The handling of the NObj at the network level, which uses a CAN2go network observer scheme, will be presented further below.

The NObj concept is independent from the way it is managed. Its "entry" form allows it to be used or managed in different ways.

A NObj entry is composed of the following Items:
NObjName:
  identifier of the NObj.
NObjNNodeName:
  Identifier of the NNODE currently managing the NObj.
NObjLastUpdate:
  Last time the NObj value was changed. It values is updated whenever a write is performed on the value. This allows the users of the sharing kernel 150 to determine if they possess the up to date value.
NObjValue: Value under the form of a BLOB, (a self-contained byte array of variable size).
NObjType: Type of the Value using the Composed Type SCHEME described further below.

Examples of NObj entries are provided in Table 1 below.

TABLE 1

| NObjName | NObjNNodeName | NObjValue | NObjType | NObjLastUpdate |
|---|---|---|---|---|
| "TEMP_VALUE" | "NODE_1234" | 23.4 | "F32_TEMP_dC" | 1231245345 |
| "TEMP_SETPOINT" | "NODE_1234" | 50.5 | "F32_TEMP_dC" | 1231245346 |
| "ALARM_1" | "NODE_1234" | 1 | "B8" | 1231245347 |
| "FLOW_GRAPH_1" | "FLOOR1" | 0x03023A03b4bb4b4b4 b4b4b464A33b4bb4b4b 4b4b4b464A33b4bb4b4 b4b4b4b464A3 | BLOB200 | 1231245300 |
| "HUMIDITY_1" | "NODE_222222" | 20.3 | "F64" | 1231245310 |
| "NAME" | "NODE_222222" | "NODE_222222" | "STR" | 1231245312 |

Network Node (NNode)

The NNode entry represents a physical or virtual node which participates in the network. Each participant in a network manages its own list of seen NNode.

A NNode entry is added to the sharing kernel 150 when seen on the network and that interaction with it is desired. The NNode entry can be removed if it is not seen anymore or if no interaction with it is desired anymore.

The NNode concept is independent from the way it is managed. Its "entry" form allows it to be used or managed in different ways.

The NNode is defined by the following property:
NNodeName:
  Identifier of the NNode.
NObjList:
  List of NObj identifier the node is known to manage.
COMLayer:
  Communication layer on which the node is currently seen.
Examples of NNodes entries are provided in Table 2 below.

TABLE 2

| NNodeName | NObjList | COMLayer |
|---|---|---|
| "NODE_4534" | "NAME, TEMP_VALUE, PID_SETPOINT, ..." | "CAN2go_Zigbee_1" |
| "ROOF2" | "NAME, FLOW_VALUE, PID_SETPOINT, ..." | "CAN2go_Zigbee_1" |
| "NODE_8888" | "NAME, TEMP_VALUE, PID_SETPOINT, ..." | "CAN2go_CANbus_1" |
| "ROOF1" | "NAME, FLOW_VALUE, PID_SETPOINT, ..." | "BACNET_1" |
| "FLOOR453453" | "NAME, ALARMS, ..." | "CAN2go_CANbus_2" |
| ... | ... | ... |

When a node needs a certain NObj which is not available in the NObj database, it searches the NNode database. If the NObj is found, a call to an Observer_Add process is sent to the NNode managing the NObj. The process of using an external NObj is described further below. The Observer_Add process will add the NObj to the NObj database.

CAN2go Type Scheme

The CAN2go type scheme allows multi-type qualifying of any data unit.

The type is presented under the form of a string of variable length:

"XXX_YYY_ZZZ_..."

XXX: Defines the binary format of the data. A few examples of binary type qualifiers are as follows:

"F32": 32 bits floats, IEEE standard;
"UI16": 16 bits unsigned integer;
"SI28": 28 bits signed integer;
...

YYY: Provides additional typing; and
ZZZ: Provides additional typing;
Examples of types are as follows.
"UI32": unsigned 32 bits;
"F32_TEMP": Float 32 bits temperature; and
"F64_FLOW_LPM": Float 64 bits flow liters by minutes.

The XXX field is a mandatory field but the other fields are optional and may be omitted. Furthermore, additional fields may also be added. The fields are separated by a separator '_'. Some advantages of this type scheme are infinite typing possibility, user define types, human readable types and filterable friendly types.

Scripting Language

The scripting language used in an illustrative embodiment of the present invention is an extended version of the Lua scripting language, which includes support for parallelism that allows more intuitive scripting of behaviors required in the control industry.

It adds the following commands to the Lua scripting language:

```
POWER UP
ON / OFF / AND / OR / (NOT) / (XOR)
IF...THEN...ELSEIF...ELSE...ENDIF
IFONCE...ENDIF
(IF...CHANGED THEN...ENDIF)
SWITCH
SCALE
MIN / MAX / (LIMIT)
ONFOR / (OFFFOR)
DOEVERY...ENDDO
SUB...ENDSUB (pas de GOTO)
FOR...ENDFOR
```

CAN2go Network Observer Scheme

This scheme allows reliable control data communication between large amounts of nodes over different slow network links such as wireless Zigbee or 6loWPAN (802.15.4) in a homogenous manner.

The general idea is to keep the network traffic as low as possible by sending only data on which a monitoring request as been submitted, preventing the monitoring node to have to request the data every time it needs it. The scheme is an implementation of the OBSERVER pattern specialized for robust monitoring and control applications.

The server NNode is the node presenting the NObj and the client NNode is the node requesting the NObj monitoring.

The scheme assumes that network nodes discovery and mapping is handled by another scheme. In an illustrative embodiment of the present invention, a heartbeat technique such as described our International patent application PCT/CA2008/002148 is used for this purpose, the contents of which is hereby incorporated by reference. A node being aware of its network neighborhood node can then retrieve their NObj.

The scheme can be implemented on any protocol which allows representation of the NObj and NNode.

Three fundamental messages are used in the scheme, namely:

Observer_Add

The Observer_Add message is sent by a node wanting to monitor a network object. The message is sent to the node currently managing the NObj. It must contain at least the following information:

PACKET_OBSERVER_ADD: An indicator that this message is an Observer_Add request.

NOBJ_REF: identifier of the requested NObj. In the illustrative embodiment of the present invention, it is composed of the monitored NObj managing NNode identifier and of the monitored NObj identifier itself:
NNODE_ID NOBJ_ID
For example:
"NODE_12354.EN_TEMP"

OBSERVER_TYPE: Type of observation to perform. At least the following type must be allowed.
ONCHANGED:
Emit a Notify everything the NObj value change.
ONINTERVAL:
Emit a notify at the specified period.
INPERIOD:
Emit a single notify after the specified period.

CALLBACKINFO: Information on how the Notify should be conducted. (Destination address, layer, ...) This is protocol specific.

Observer_Remove

This message is sent to stop the observer process.

PACKET_REMOVE_MSG: An indicator that this message is an Observer_Remove request.

NOBJ_REF: identifier of the requested NObj. In the illustrative embodiment of the present invention, it is composed of the monitored NObj managing NNode identifier and of the monitored NObj identifier itself:
NNODE_ID.NOBJ_ID.

CALLBACKINFO: Information on how the Notify was set by the Observer_Add message. This is used to remove the proper observer since more than one can be placed on a same NObj by a same node.

Obersver_Notify

PACKET_REMOVE_MSG: An indicator that this packet is an Observer_Notify request.

NOTIFYINFO: Information on the event which triggered the notify. It must contain at least the NOBJ_REF. (NNODE_ID.NOBJ_ID) It may contain the type of event which triggered the notify. It may contain the value of NObj, thus preventing a value retrieve request. It may contain other information such as time of the event. Optional content should be decided in function of the protocol used.

The advantages of this scheme is that it is protocol independent, multiple observers of a same node NObj on the same NNode may be used on broadcast, or on point-to-point networks, multiple observer packets can be placed in a single packet, an observer can be placed on a network mapping item, which allows the placement of an observer on the network state itself.

Figure 8:
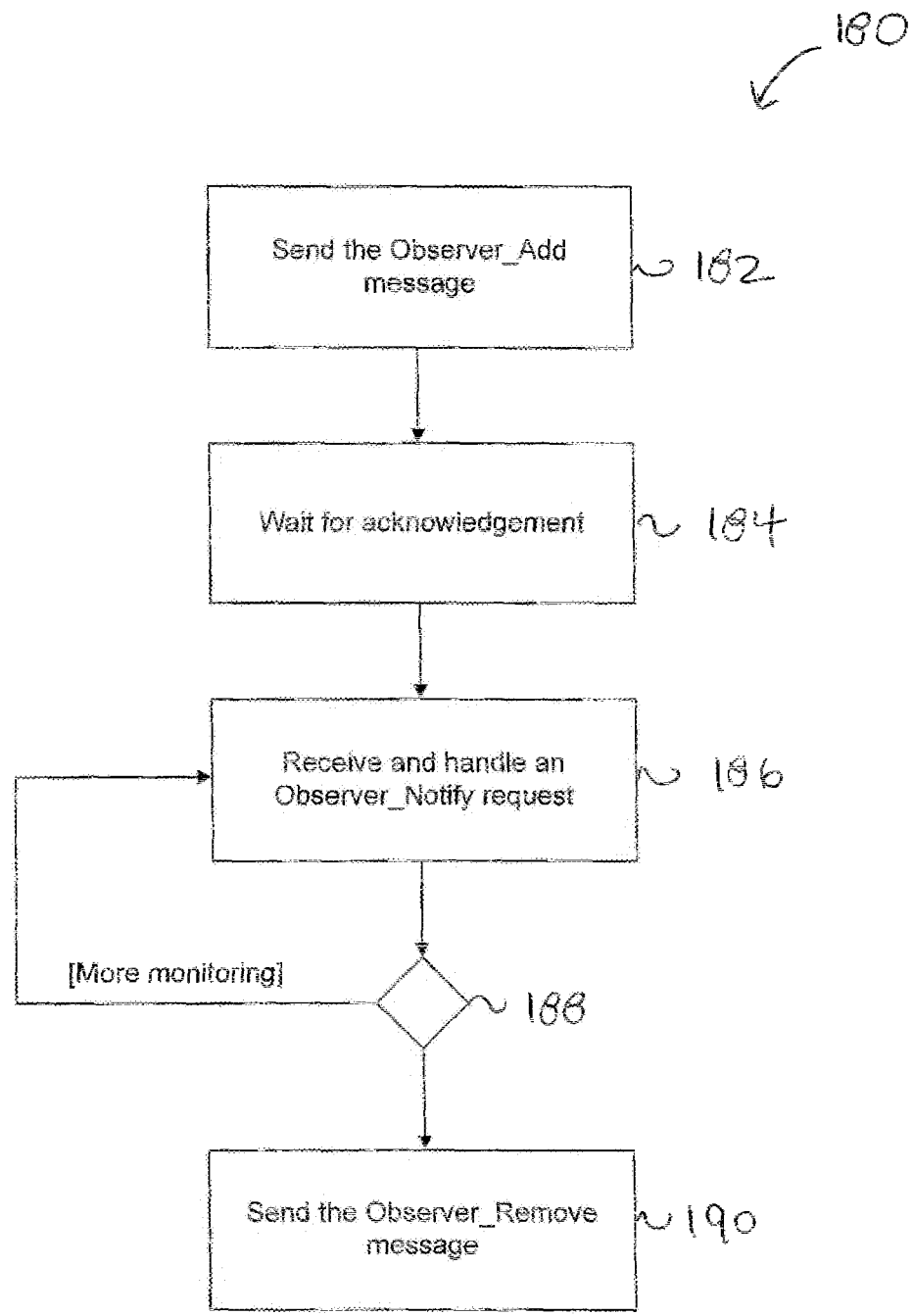
FIG. 8 is a flow diagram of the network observer scheme process in accordance with an example embodiment.

Referring now to FIG. 8, there is shown a flow diagram of the network observer scheme process 180 in accordance with an example embodiment.

When a node wants to monitor a network object then, at step 182, the node sends an Observer_Add message to the node currently managing the NObj.

At step 184, the node that sent the Observer_Add message waits for an acknowledgement that the message was received.

Events trigger notifications and Observer_Notify request message(s) are sent to monitoring nodes. At step 186, the monitoring node receives and handles the Oberserver_Notify request as configured. As shown at step 188, the monitoring node continues to monitor network objects and events trigger Observer_Notify request message(s) to be continually propagated to the monitoring node.

At step 190, a monitoring node sends an Observer_Remove message to stop the observer process.

Figure 9:
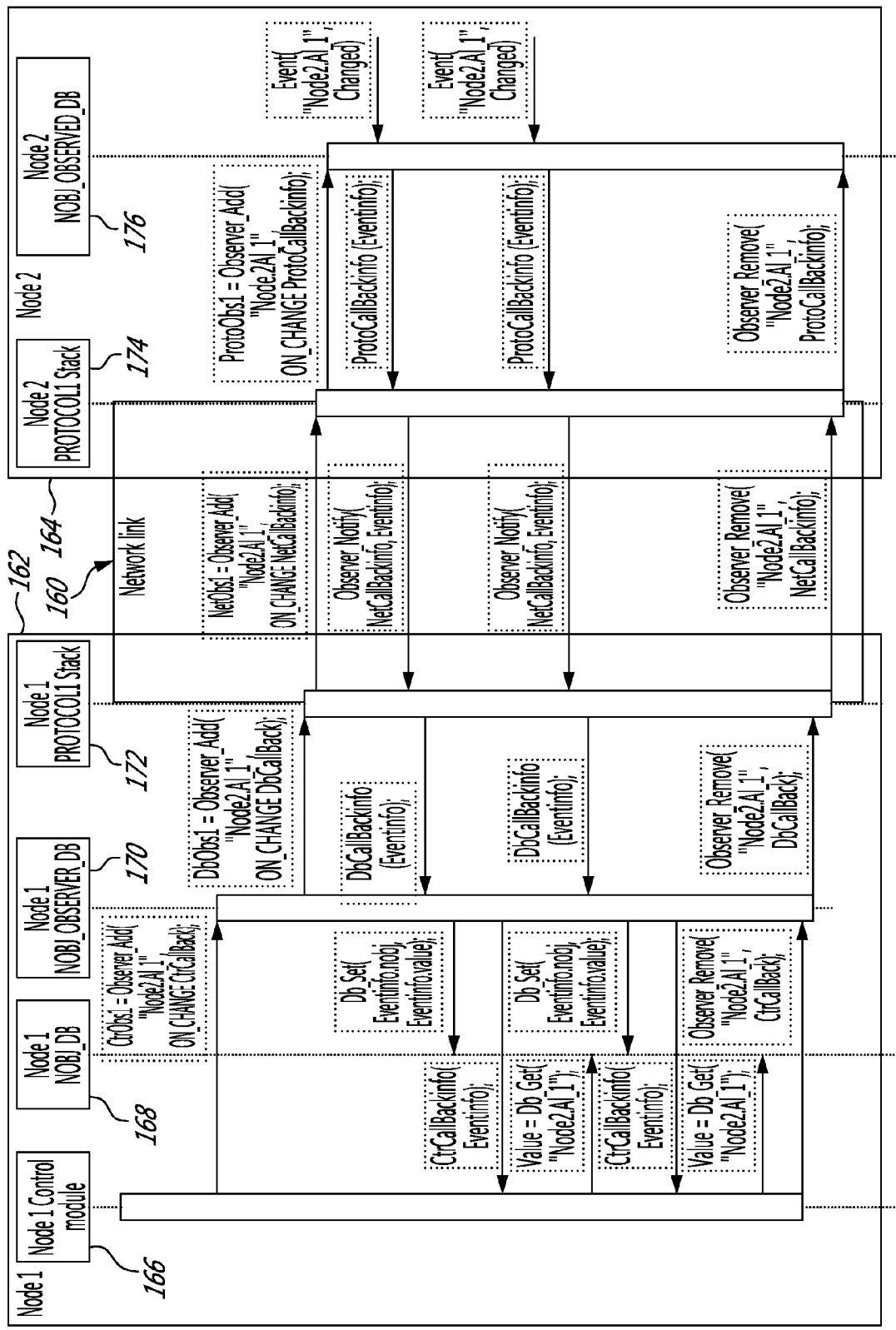
FIG. 9 is a sequence diagram of the CAN2go observer scheme in accordance with an example embodiment.

Referring now to FIG. 9, there is shown a sequence diagram of the CAN2go observer scheme in accordance with an example embodiment. Box 160 illustrates the sequence of the CAN2go observer scheme between two nodes, Node1 162 and Node2 164. An Observer_Add message originates at the control module 166 of Node1 162 and is recorded in the network object observer database 170 of Node1 162. The Observer_Add message is forwarded to the Protocol Stack 172 of Node1 162 and then sent to the Protocol Stack 174 of Node2 164. Upon receipt, the Observer_Add message is recorded in the network object observer database 176 of Node2 164.

An event triggers a lookup to the network object observer database 176, and, through the Protocol Stack 174, Node2 164 sends an Observer_Notify request to Node1 162 which contains network callback information and event information. Upon receipt, Node1 162 records the event information in the network object observer database 170. The event information is also recorded in the network object database 168, including the network object that triggered the event and values for the event. The control module 166 is also notified of the event and can retrieve the event information from the network object database 168.

An Observer_Remove message originates at the control module 166 and is recorded in the network object observer database 170 of Node1 162. The Observer_Remove message is forwarded to the Protocol Stack 172 of Node1 162 and then sent to the Protocol Stack 174 of Node2 164. Upon receipt, the Observer_Remove message is recorded in the network object observer database 176 of Node2 164 to stop the observer process.

DCM Communicate Function

A DCM 100 has different communication needs in order to communicate with other DCMs 100 and end devices. To fulfill those needs, multiple hardware communication interfaces can be strategically joined together on a single hardware platform (i.e. board). Referring now to FIG. 10, there is shown a view of a DCM 100 with communication interfaces, in accordance with an illustrative embodiment of the present invention. The DCM 100 communication interfaces include an Ethernet bus 101, a CAN bus 102, a Wireless Zigbee/802.15.4 transceiver (bus) 103 and a Wireless EnOcean transceiver (bus) 104. The DCM also includes a central processing unit. The DCM 100 may further include a WiFi bus.

The Ethernet bus 101 is used for wired or wireless communication with the outside world. For example, the Ethernet bus 101 may provide a wired communication link to DCMs 100 or end devices.

Figure 11:
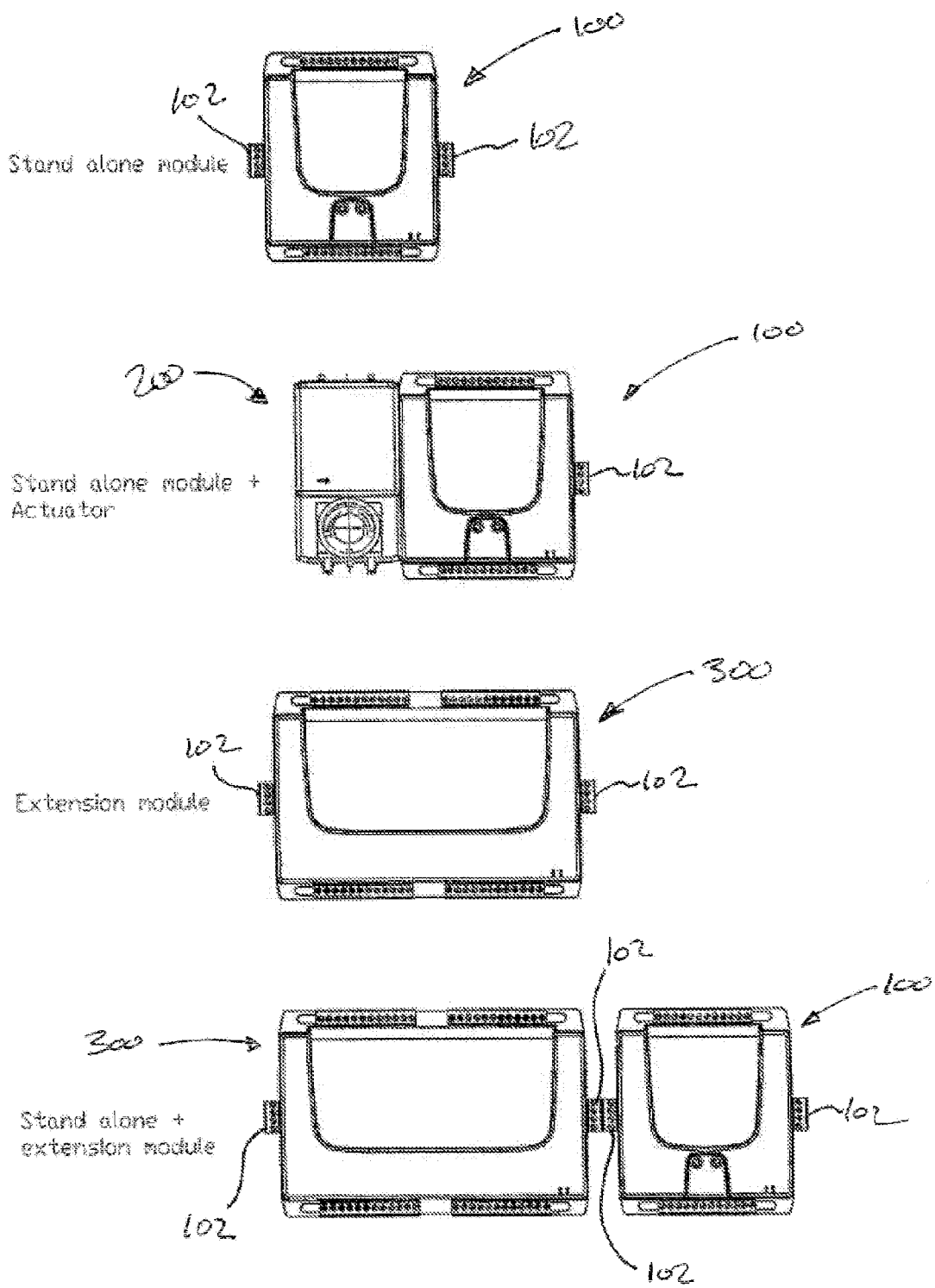
FIG. 11 is a view of DCMs with various extension modules in accordance with an example embodiment.

The CANbus 102 is used for local communication when high data rates and high reliability are required or if wireless communication is impossible such as in Faraday cage conditions. The CANbus 102 can also be used for adding actuators 200 and extension modules 300 as shown in FIG. 11 modules may be mechanically attached to the DCM 100 and software modules may be programmed into the central processing unit of the DCM 100 to provide additional "Control Functions" to a system.

The wireless Zigbee/802.15.4 bus 103 covers a wide range through meshing. Some benefits of meshing include lower bandwidth usage and ability to communicate in view of interference and obstacles by repeating a signal from one device to another. It is used for DCM 100 to DCM 100 communication, which allows collaboration of the DCM functions 110, 120, 130 and 140 through the sharing kernel 150. Wireless Zigbee/802.15.4 communication also covers DCM 100 to powered and battery powered end device communication, such as wireless light switches, electrical meters, and electronic equipment for example. As further example, a WiFi bus may also be used.

The EnOcean wireless bus 104 allows communication with energy autonomous devices, such as battery less and ultra-low power devices. Those devices generally provide functionalities such as switches, relays or thermostats, where data rates are low. Wireless connections in the context of building automation prevent having to spend money on cabling and in man's work required for their installation.

Data exchanges over those tour buses (i.e. 101, 102, 103 and 104) are performed using the Observer Scheme previously described, which allows homogenous management of data and of the software communications.

The CANbus 102, wireless Zigbee/802.15.4 bus 103, wireless EnOcean 104, and Ethernet bus 101 can be used in parallel to provide link redundancy and increased robustness.

Figure 12:
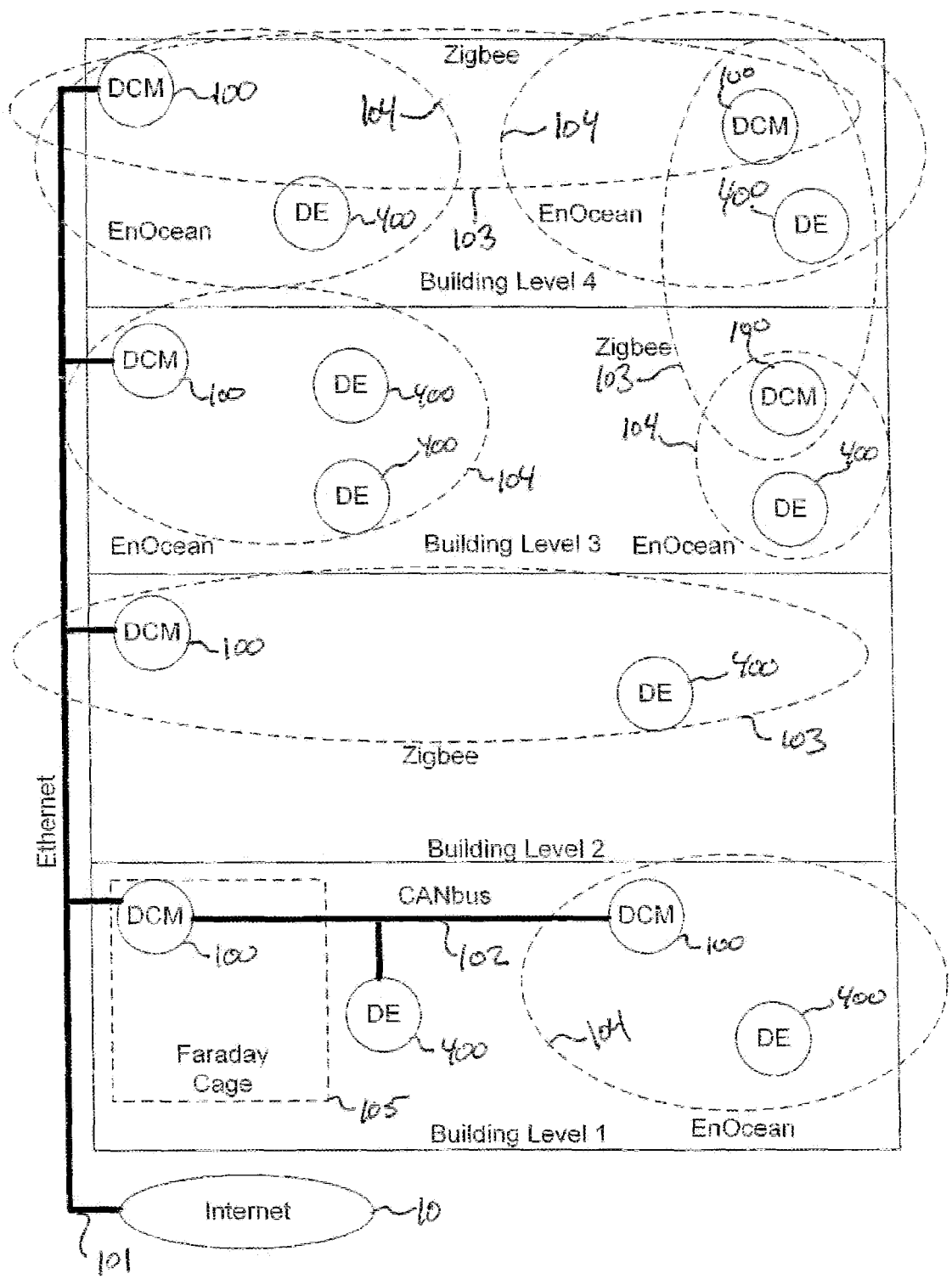
FIG. 12 is a schematic view of the communication coverage of a building automation by the various DCM communication interfaces in accordance with an example embodiment.

Referring now to FIG. 12, there is shown a schematic view of the communication coverage of a building automation by the various DCM 100 communication interfaces in accordance with an example embodiment. In particular the schematic illustrates an example of the use of the four types of communication buses 101, 102, 103 and 104 in order to cover needs of a four level building automation. The communication buses 101, 102, 103 and 104 function together to provide a mesh network between DCMs 100 and end devices (DE) such as sensor/actuator devices.

EnOcean bus 104 provides a wireless communication link between DCM 100 and one or more DEs 400. Zigbee/

802.15.4 bus 103 provides a wireless communication link between DCMs. The CANbus 102, as previously mentioned, may be used in situations where wireless communication is not possible, as is the case on the first level of the building where a DCM 100 is located within a Faraday cage 105.

An Ethernet bus 101 links DCMs 100 located on each floor of the building and provides Internet 10 accessibility to multiple DCMs 100 and DEs 400 located throughout the building through wireless Zigbee/802.15.4 103 and EnOcean 104 buses as well as a CANbus 102.

As shown, a DCM 100 may act as a gateway digital control manager. Such a DCM 100 has the ability to communicate with an external device via the Internet, for example, to provide a copy of objects in the local databases of one or more other DCMs 100 on the network. Such a DCM 100 can establish a communication link to a web browser and receive data requests from the web browser. The DCM 100 may export a copy of the objects in its local database to the web browser, thereby making the web browser another node in the network. Such a DCM 100 may also store an embedded software interface to configure and monitor the DCM 100, and the other DCMs 100 and end devices on the network. The embedded software interface may be executed in the web browser to export a copy of its local database to the web browser.

Figure 13:
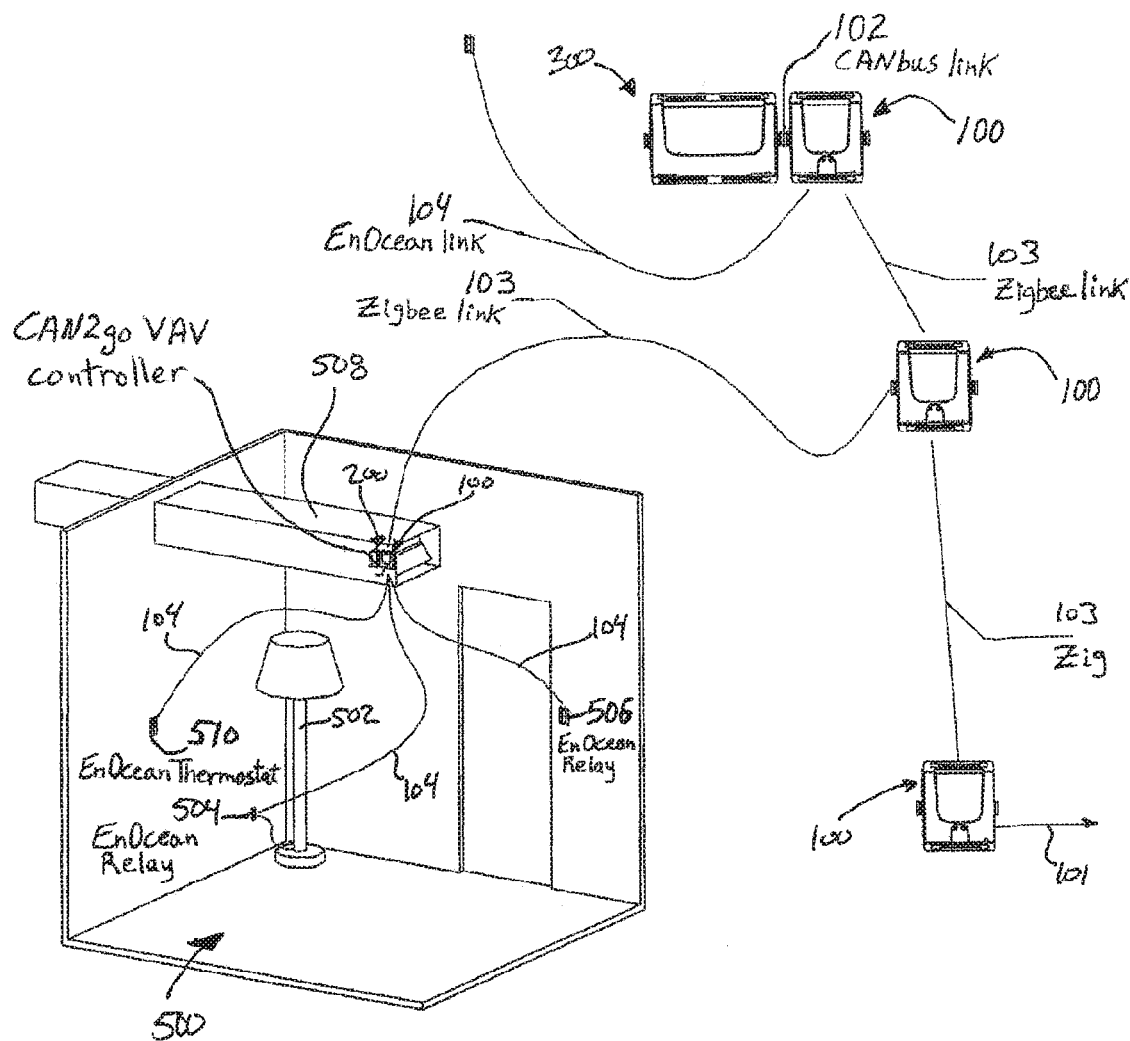
FIG. 13 is a schematic view of an example of a network of DCMs used to provide various functionalities to a room in accordance with an example embodiment.

Referring now to FIG. 13, there is shown a schematic view of an example of a network of DCMs 100 used to provide various functionalities to a room 500. Some of the functionalities include the control of a lighting fixture 502, connected to an EnOcean power outlet 504, by an EnOcean switch 506 as well as the control of an air duct 508, activated by an actuator 200 connected to a DCM 100, by an EnOcean thermostat 510. The DCM 100 located within the room 500 manages the EnOcean communications between the various EnOcean devices 504, 506 and 510. Furthermore, Zigbee/802.15.4 bus 103 communication also allows communication of the various EnOcean devices 504, 506 with other DCMs 100 located elsewhere as well as communication with the outside world via an Ethernet bus 101 in order to provide, for example, remote monitoring and control.

Wireless Building Automation Backbone Integrating Wired, Wireless, and Battery-Less Wireless End Devices Embodiments of the present invention further provide a BAS network for data exchange between controllers and end-devices. Two types of wireless transceivers that may be used in BAS include: a network transceiver, such as a 802.15.4 transceiver implementing a protocol such as Zigbee or 6lowpan, for example; and a very low power transceiver such as an EnOcean transceiver.

Implementing a BAS may be time consuming and costly because typically all controllers need to be wired, all your end devices need to be wired, end device batteries need to be changes. These issues can multiply is you need two or more controllers and one integration product.

There are companies who work to add intelligence and capacity to EnOcean products, but the protocol itself doesn't have what they need to create a big network. As an example, the devices may be asleep most of the time and consume a minute quantity of energy. These devices can't interact with other device when asleep. Additionally, to maintain a network, you need RAM which needs energy, and you need to pass more information to "manage the network" then what the protocol physically supports. The protocol only sends "telegrams" of 14 bytes.

On the other side, other companies believe EnOcean cannot do the job because there are too many limitations to the protocol and its thus better to try to increase the battery life of a device using another protocol. Following this approach the cost of ownership may increase every time a battery in a device needs to be changed. Even if the interval is very long, customers may be against being dependent on batteries.

Embodiments of the present invention provide a DCM 100 comprising a first transceiver configured to provide one or more wireless communication links to one or more energy autonomous end devices. Such an end device may be a battery-less end device, or a device that may not be using a battery. Such device may also be an energy harvesting device, using solar panels for example. For example, the first transceiver may be an EnOcean transceiver The DCM 100 further comprises a second transceiver configured to provide one or more wireless communication links to one or more digital control managers and optionally one or more end devices. For example, the second transceiver may be a Zigbee transceiver. The DCM 100 also comprises a local database of objects and their properties, and an intellectualize function module 110 configured to execute a computer program to provide intelligence to the digital control manager and to end devices in communication therewith. An example DCM 100 with two transceivers is shown in FIG. 10.

The DCM 100 may further comprise an Ethernet interface configured to provide one or more wired communication links and one or more wireless communications links to one or more digital control managers and/or one or more end devices. This enables the DCM 100 to communicate with wired and wireless DCMs and end devices. The DCM 100 may further comprise a WiFi transceiver to provide one or more wireless communications links to one or more digital control managers and/or one or more end devices.

The DCM 100 may further comprise a sharing kernel 150 configured to manage the local database, a communication function module 120 configured to convert from a plurality of protocols to a plurality of protocols using corresponding protocol stacks and drivers, a control function module 140 configured to manage input and output interfaces and further configured to control physical parameters through a set of control strategies. The sharing kernel 150 may further be configured to provide a common data exchange scheme to link components of the digital control manager via communication channels.

As will be explained further herein, the DCM 100 may further comprise an embedded software interface to configure and monitor the digital control manager and end devices in communication therewith. The embedded software interface may be exported to a web browser running on a remote computing device. When the embedded software interface is executed by the web browser a copy of the local database of the DCM 100 may be exported to the web browser, effectively making the web browser a DCM 100 in the system.

For example, as shown in FIG. 10, the two transceivers included in a single DCM 100 may be: one EnOcean transceiver 104 addressing battery-less end-devices, and one Zigbee/802.15.4 transceiver 103 forming a wireless mesh network between controllers and linking wireless end-devices. The Ethernet interface may be Ethernet bus 101 so that DCMs 100 may either be linked via wireless or wired communications links. A local database may be created within a DCM 100 for use by all applications running on the DCM 100, regardless of communications link by which and event or action request arrives at the DCM 100.

The DCM 100 is provided with "intelligence" that is scripted behaviour that may be dynamically reconfigured to alter the behaviour of an end device or a DCM 100.

These DCMs 100 may be used to implement a BAS. The DCMs 100 provide a unifying link between wireless and wired devices, both end-devices and DCMs; offering intelligence via scripted behaviours and access to data for the entire building.

Embodiments of the present invention provide may provide a DCM 100 system comprising: digital control managers having a communication interface and a local database. The system comprises a network of communication links between the digital control managers to enable data exchange between the DCMs 100, which may be wired and/or wireless communication links. The DCMs 100 may be grouped in clusters, where each cluster is connected by a cluster DCM 100 or gateway DCM 100. The system comprises end devices, wherein each end device is in communication with at least one DCM 100 by a communication link to enable data exchange between the end device and the DCM 100. The communication link may be a wired or wireless communication link. The DCMs control and monitor the end devices. The system further comprises at least one distributed database comprising a copy of the objects of the local databases of some or all DCMs 100 in the system. The distributed database may provide a centralized store for all data in the system.

The system may comprise a DCM 100 that is a gateway control manager. The gateway control manager is configured to communicate with an external device to provide access to the local database of the at least one gateway control manager. The local database of the at least one gateway control manager comprises a copy of the objects of the local database of at least one other digital control manager. That is, the gateway control manager has network access outside the system and can make data within the system available outside the network. For example, an authorized remote computer can log into a gateway control manager and download a copy of its local database. If the remote computer updates its copy of the local database, the updates are propagated to the system of DCMs 100 and end devices.

There may be multiple gateway control managers in the system. As a illustrative example, the system may comprises a first gateway control manager, wherein the local database of the first gateway control manager comprises a copy of the objects of the local database of at least one other digital control manager, and a second gateway control manager, wherein the local database of the second gateway control manager comprises a copy of the objects of the local database of at least one other digital control manager;

The first gateway control manager is configured to communicate with the second gateway control manager and is configured to provide the second gateway controller with a copy of the objects of the local database of the first gateway control manager.

As a gateway, the first gateway control manager is configured to communicate with an external device and provide the external device with a copy of the objects of its local database. Similarly, as a gateway, the second gateway control manager is configured to communicate with an external device and provide the external device with the copy of the objects of its local database. In addition, the second gateway control manager is configured to provide the external device a copy of the objects of the local database of the first gateway control manager.

The DCMs 100 may be grouped into clusters, where each cluster is assigned to manage a floor or segment of a building; The BAS integrates the clusters via wired or wireless communication links to create a building automation bus to enable data exchange between the DCMs 100. The BAS manages end devices, where each end device is in communication with at least one DCM 100 by either wireless or a wired communication link to enable data exchange between the end device and the DCM 100.

The BAS is operable to integrate the local databases of all the DCMs 100 into a single distributed database accessible from a designated gateway controller. FIG. 12 illustrates an example of this. For example, a DCM 100 connected to Ethernet bus 101 may act as a gateway to external devices connected via the Internet. The gateway DCM 100 can store a copy of the objects of the local databases of some or all DCMs 100 and DEs 400 on the network, to provide the distributed database. Some DCMs 100 may store copies of objects in the local databases of DEs 400 and other DCMs 100, and provide the gateway with a copy. Any updates to the distributed database will be propagated within the network and from/to the external device.

Distributed databases may be implemented for each cluster by integrating the local databases of each DCM 100 in the cluster. The BAS may be implemented such that there is a designated gateway digital control manager for each cluster of DCMs 100. The BAS may implement a distributed database for each cluster of DCMs 100, wherein each distributed database is configured to access and manage the local databases of all DCMs 100 of the corresponding cluster. Each designated gateway control manager is configured to access the corresponding distributed database for the cluster.

In-Node Multi Protocol Data Management of a Wired/Wireless Network

Embodiments of the present invention further provide an efficient database management method for a low bit rate communication network. The method enables a single coherent view of data accessible from a single point on the bus. The method is implemented to address low data rates of a wireless network such as Zigbee/802.15.4. The building automation bus is capable of speaking to and managing devices that are unidirectional and only send data on events, such as EnOcean switches for example. The method is operable to manage a large number of devices distributed over multiple floors or area clusters.

Because lower speed protocols (e.g. Zigbee/802.15.4) have very little bandwidth, a solution is needed to reduce the traffic over these protocols to optimize the bandwidth and reduce latency on requests. To achieve this goal, the method keeps values in database and only transmits modifications.

Figure 14:
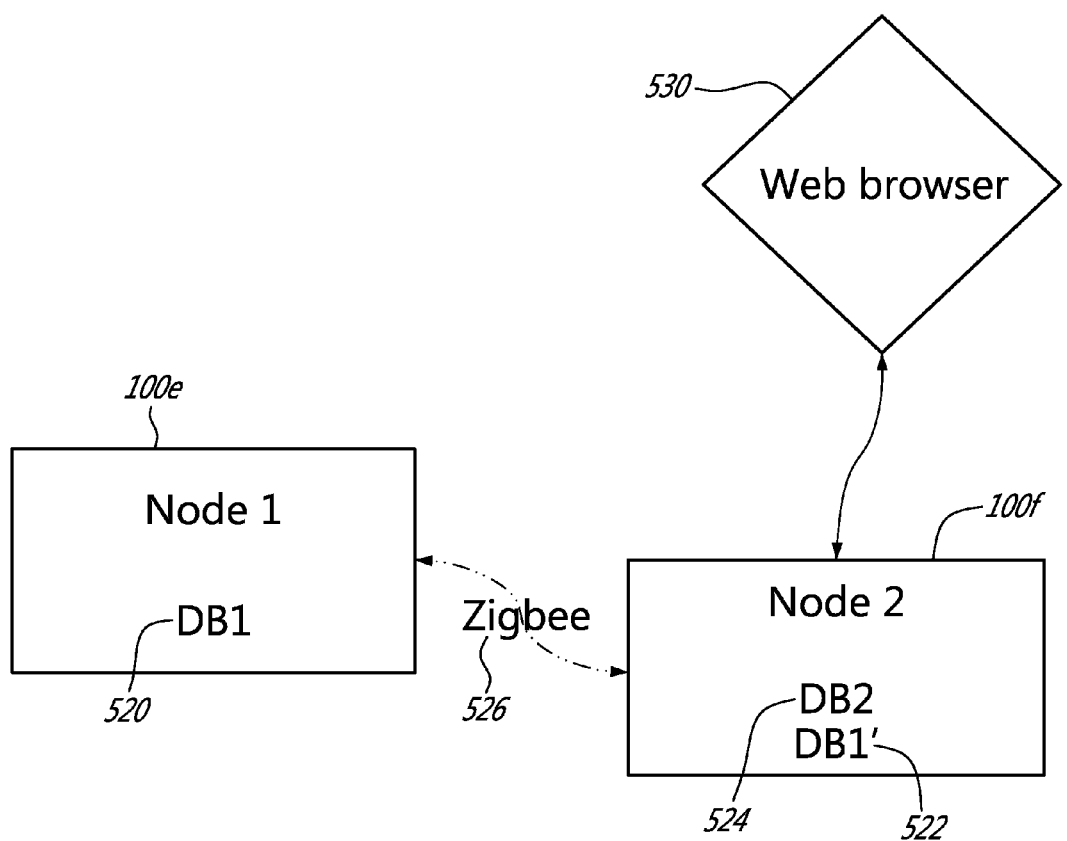
FIG. 14 is a schematic representation of a network of two DCMs in accordance with an example embodiment.

Referring now to FIG. 14, there is shown a schematic representation of a network of two DCMs 100. In accordance with an example embodiment of the database management method, a copy of local DB1 520 stored in the local memory of DCM 100*e* is created. The copy of DB1 522 is stored in the local memory of DB2 100*f*, along with its local DB2 524. After that, synchronization is only performed for changed values in DB1 520, by transmitting the changed values over a communication link 526. A web browser 530 can also request synchronization of a specific object, such as DCM 100*e*, on demand and can access data values via DCM 100*f*.

Figure 15:
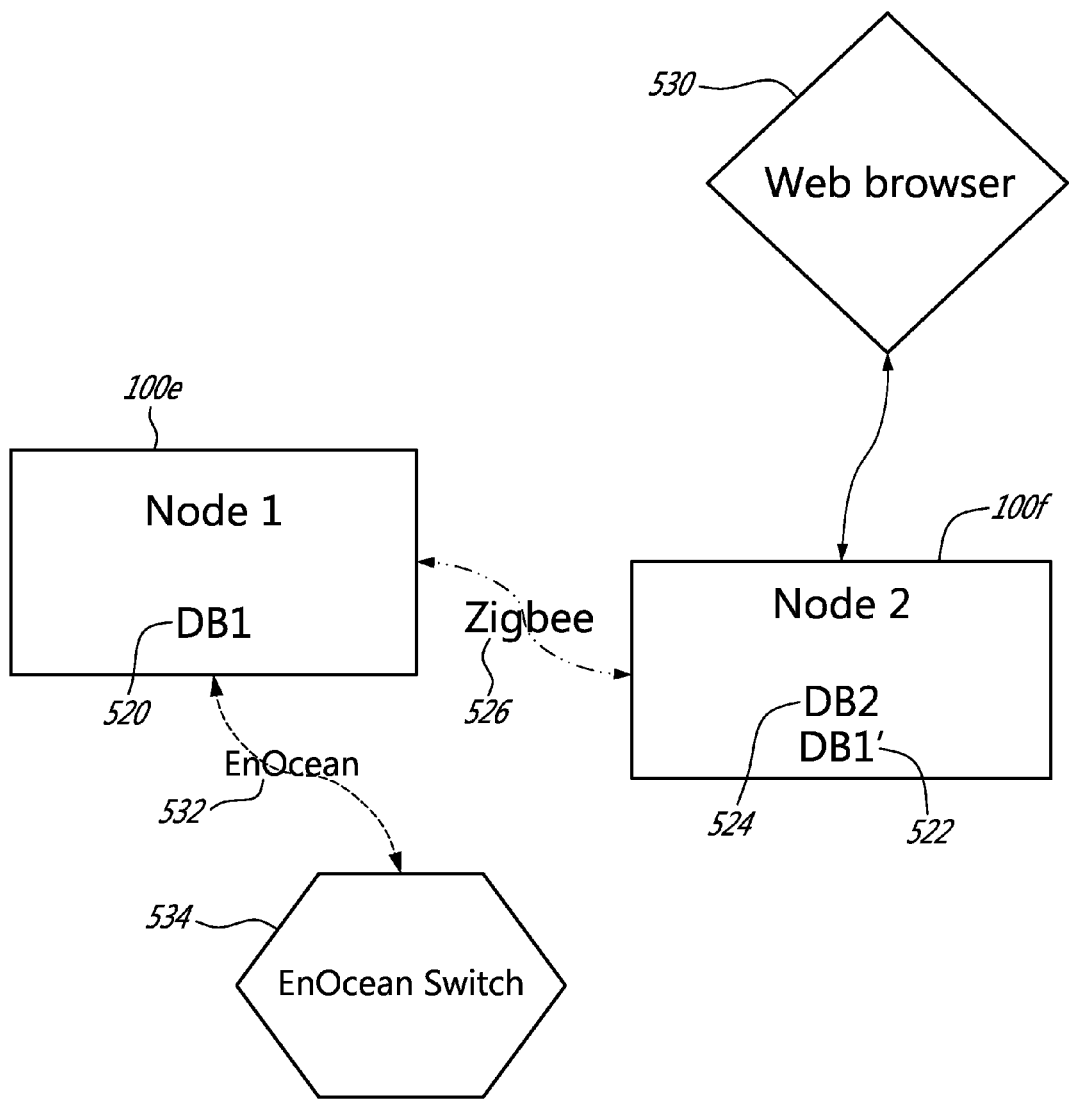
FIG. 15 is another schematic representation of a network of two DCMs in accordance with an example embodiment.

Referring now to FIG. 15, there is shown another schematic representation of a network of two DCMs 100. In accordance with an example embodiment of the database management method, DCM 100*e* maintains values for an end device, such as EnOcean switch 534 in its local DB1 520. As above, a copy of DB1 522 is stored on DCM 100*f*. Only updated data values are transmitted to synchronize DB1 520 and the copy DB1 522. When the web browser 530 performs a request for the state of the EnOcean switch 534, the value that was store in copy DB1 522 is returned.

In order to create a single coherent view cluster controllers (DCMs 100) maintain local copies of the databases of a portion or all of the DCMs 100 in cluster. Individual DCMs 100 transmit changes only to the cluster controllers. Cluster controllers re-sync local copies of the databases on an ongoing basis when there are no transactions. Gateway controllers maintain local copies of Cluster databases, again only changes are transmitted in normal operations. Operations may be carried in any database at any level of the network/bus and the rest of the network will automatically resynchronize. By distributing the data in this manner and allowing operations to be initiated at any point there is no delay in an initiating application in setting up and issuing an action or information request. FIG. 12 illustrates an example of clusters and gateways. There may be gateway DCM 100 in communication with another gateway DCM 100 for efficient data exchange.

Referring now to FIG. 16 there is shown flowchart diagram of a database management method 600 for a low bit rate communication network in accordance with an example embodiment. The method 600 aims to reduce bandwidth usage by sending only updates and not requiring a communication link to be maintained to the gateway control manager, and reduce latency for responding to data requests.

Step 602 comprises establishing communication links between DCMs 100 and end devices, wherein each DCM 100 comprises a local database of objects. This results in a network of DCMs 100 and end devices, so that the DCMs 100 can control and monitor end devices as well as exchange data with other DCMs 100. FIGS. 12 and 13 illustrate examples.

Step 604 comprises designating at least one of the DCMs 100 s to be a gateway control manager. There may be one or multiple gateway control managers. As noted above, the gateway control manager can connect to devices external to the network of DCMs 100 and end devices to provide such external device access to the data in the system and network from other DCMs 100 and end devices. As an example, FIG. 12 illustrates a DCM 100 connected to the Ethernet bus 101 and in communication with another DCM 100, which is in turn in communication with another DCM 100, to provide a chain of gateways. FIG. 13 illustrates an example application.

Step 606 comprises, for at least one DCM 100, storing a copy of the objects of the local database of the at least one DCM 100 in the local database of the gateway control manager. This enables the gateway control manager to provide a copy of the data from other DCMs 100 to external devices, even when the DCM is turned off or otherwise not accessible.

Step 608 comprises determining whether an object of the local database of the at least one DCM 100 is updated.

Upon determining that an object is updated, step 608 comprises synchronizing the local database of the gateway control manager by making a corresponding update to the copy of the object that was updated. If there are not updates then no data is transmitted. Only transmitting updates reduces bandwidth usage. The complete object that was updated may be transmitted or only the incremental change.

The database management method 600 may further comprise the steps of establishing a communication link between the gateway control manager and a web browser on a device external to the network of DCMs 100 and end devices. FIG. 12 illustrates a DCM 100 connected to the Internet, which may in turn be connected to the web browser or other software interface application. The gateway control manager may receive a data request from the web browser and provide the web browser with access to the local database of the gateway control manager. To reduce bandwidth usage, providing access may comprise exporting a copy of the local database of the gateway control manager to the web browser so that a network connection between the web browser and the gateway control manager does not have to be maintained.

The database management method 600 may further comprise the steps of establishing a communication link between the gateway control manager and a web browser. The gateway control manager may receive a synchronization request from the web browser at, wherein the synchronization request identifies one or more DCMs 100. Method 60 may further comprise determining whether an object of the local database of the one or more DCMs 100 is updated, and upon determining that an object is updated, synchronizing the local database of the gateway control manager by making a corresponding update to the copy of the object that was updated. That is, the web browser may prompt the gateway control manager to ensure its local database is synchronized. Further, the web browser may request that its own copy of the local database be synchronized with the current local database of the gateway control manager.

The database management method 600 may further comprise the steps of establishing a communication link between the gateway control manager and a web browser, and establishing a communication link between an end device and a DCM 100, wherein the local database of the digital control manager stores objects corresponding to a state of the end device. A copy of the objects corresponding to the state of the end device of the local database of the at least one DCM 100 may then be stored in the local database of the gateway control manager. The gateway control manager may receive a state request from the web browser, wherein the state request identifies the end device, and in response, provide the web browser with access to the copy of the objects corresponding to the state of the end device in the local database of the gateway control manager. To reduce bandwidth usage, providing access may comprise exporting a copy of the objects corresponding to the state of the end device to the web browser so that a network connection between the web browser and the gateway control manager does not have to be maintained.

Figure 17:
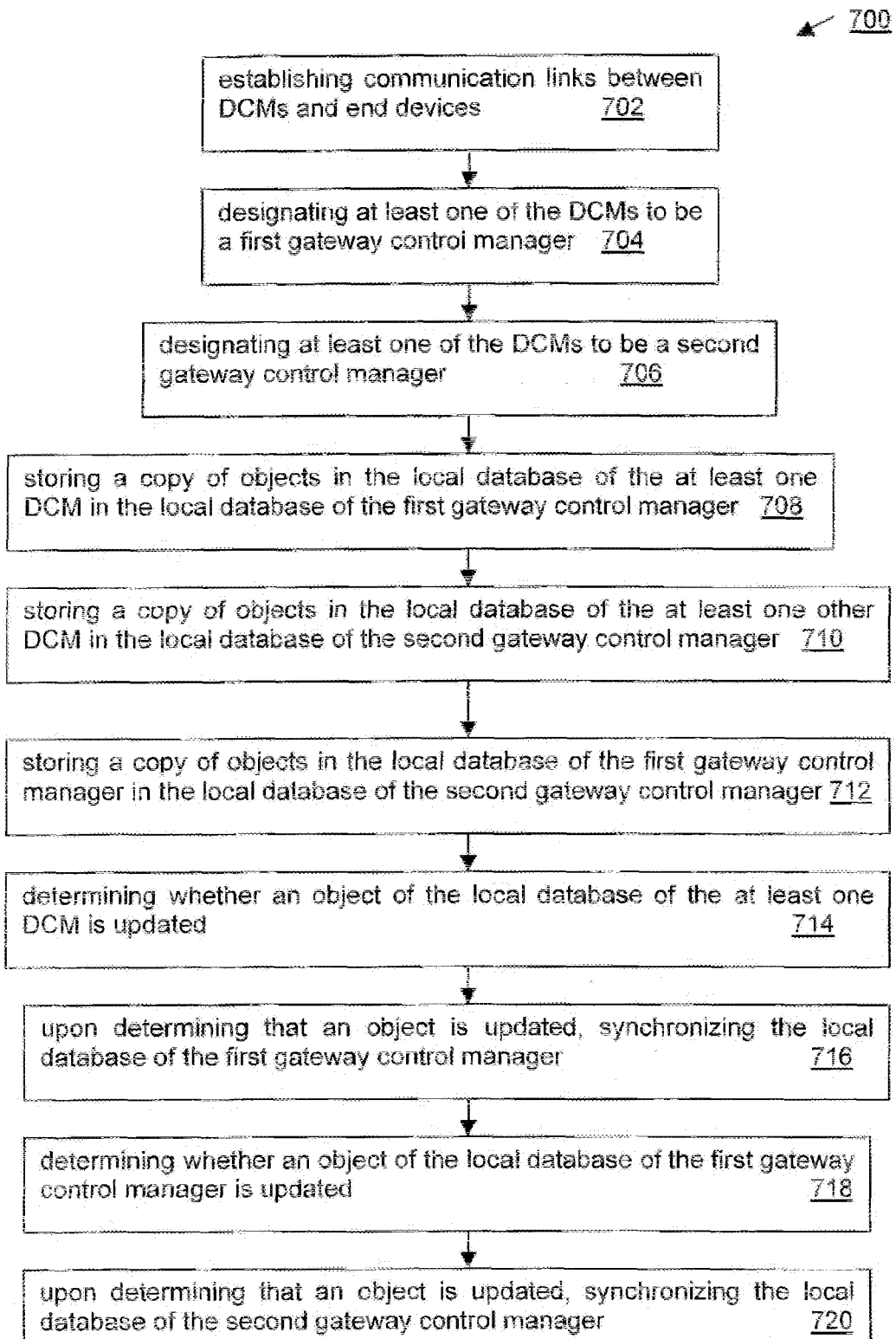
FIG. 17 is a flowchart diagram of a database management method for a low bit rate communication network in accordance with another example embodiment.

Referring now to FIG. 17 there is shown flowchart diagram of a database management method 700 for a low bit rate communication network in accordance with an example embodiment. The method 700 aims to reduce bandwidth usage by sending only updates and not requiring a communication link to be maintained to the gateway control manager, and reduce latency for responding to data requests.

Step 702 comprises establishing communication links between a plurality of digital control managers and a plurality of end devices, wherein each digital control manager comprises a local database. FIG. 12 illustrates an example network.

Step 704 comprises designating one of the digital control managers to be a first gateway control manager. FIG. 12 illustrates a DCM 100 that acts as a gateway.

Step 706 comprises designating one of the digital control managers to be a second gateway control manager. FIG. 12 illustrates a DCM 100 that acts as another gateway.

Step 708 comprises for at least one digital control manager, storing a copy of the objects of the local database of the at least one digital control manager in the local database of the first gateway control manager.

Step 710 comprises for at least one other digital control manager, storing a copy of the objects of the local database of the at least one other digital control manager in the local database of the second gateway control manager.

Step 712 comprises storing a copy of the objects of the local database of the first gateway control manager in the local database of the second gateway control manager.

Step 714 comprises determining whether an object of the local database of the at least one digital control manager is updated.

Step 716 comprises upon determining that an object is updated, synchronizing the local database of the first gateway control manager by making a corresponding update to the copy of the object that was updated Step 718 comprises determining whether an object of the local database of the first gateway control manager is updated.

Step 720 comprises upon determining that an object is updated, synchronizing the local database of the second gateway control manager by making a corresponding update to the copy of the object that was updated.

Local Embedded Interface

Embodiments of the present invention further provide a local embedded interface on the DCM 100.

Building automation networks may consist of a primary and secondary bus which connect high-level controllers (generally specialized for building automation, but may be generic programmable logic controllers) with lower-level controllers, input/output devices and a user interface (also known as a human interface device). The primary and secondary bus can be BACnet, optical fiber, Ethernet, ARCNET, RS-232, RS-485 or a wireless network.

Most controllers are proprietary. Each company has its own controller for specific applications. Some are designed with limited controls: for example, a simple Packaged Roof Top Unit. Others are designed to be flexible. Most have proprietary software that will work with ASHRAE's open protocol BACnet or the open protocol LonTalk.

Inputs and outputs are either analog or digital (some companies say binary). Analog inputs are used to read a variable measurement. Examples are temperature, humidity and pressure sensor which could be thermostat, 4-20 mA, 0-10 volt or platinum resistance thermometer (resistance temperature detector), or wireless sensors. A digital input indicates if a device is turned on or not. Some examples of a digital input would be a 24VDC/AC signal, an air flow switch, or a volt-free relay contact.

Analog outputs control the speed or position of a device, such as a variable frequency drive, a I-P (current to pneumatics) transducer, or a valve or damper actuator. An example is a hot water valve opening up 25% to maintain a set point. Digital outputs are used to open and close relays and switches. An example would be to turn on the parking lot lights when a photocell indicates it is dark outside.

An issue that may arise is that the control contractor needs vendor specific software to configure the system and the DCMs. A contractor must have vendor specific software that must be keep current over the 10 year lifespan of the system. A typical use case for traditional controllers would require a given controller to be programmed with that manufacturer's software, possibly even requiring a specific OS version. Another issue is that if the Building owner wants a front-end solution, they need a dedicated web server. When the building is too small, the return on investment is too low to justify the cost of a server Embodiments of the present invention relate to an embedded software interface, such as java script application, stored within the DCM 100 but executed in a web browser. The embedded software interface may be used to configure and monitor the DCM 100 and the system. The embedded software interface provides a highly portable web browser extension (or plug-in). The complete application is run within the browser on a computing system. The DCM 100 database is exported to system running the browser application which then effectively becomes a new DCM 100 in the network, using its local database copy to formulate requests and actions and synchronizing its local database with the other databases in the building. This configuration does not provide a client/server relationship. Only database synchronization between controller and web browser (peer-to-peer relationship). Having a non-proprietary local interface for configuration enables maximum interoperability with third party vendors. An on-board user/configuration web interface removes dependencies on outside tools/proprietary software/versions. A user, for example, could go back 10 years later on a job site and still be fully capable of configuring and managing the network and DCMs 100. Because the data is resident on low power devices operating at least in part over low speed links, and there is by design no web-server required in the building, real time performance is achieved by effectively creating a new DCM 100 in the building network running locally on the contractor's computer.

When a contractor logs in to configure or re-configure an end device or DCM 100, the data of the gateway management controller to which the contractor logs is copied to the local memory of the contractor's computer. The browser application which is based on Java Script then operates on the local database but synchronizes its changes with the other controllers in the building network as would any other DCM 100. The interactions between the contractor's computer and the gateway control manager of the Building Automation Network consist entirely of database updates which are short messages easily handled by low power systems.

Actions are carried out via the database updates once an update reaches the DCM 100 that is directly connected to the targeted device; this DCm 100 carries out the requested action, confirms if possible the new state of the end-device, and updates its database. In the event that an action fails, the end-device DCM 100 initiates a new database update reflecting the actual end state of the device.

So while the data repository is the database distributed across the building DCM 100, the data server becomes the contractor's computer. This inverts the usual client server relationship in which a thin client interacts with a powerful server. Here a thick client interacts with a low power server in an efficient manner.

When the contractor logs off the local copy of the database is deleted to prevent synchronization errors. This scheme enables maximizing the controller's limited resources without requiring an independent server or a server hosted on the controller. The web interface application is downloaded from a single controller but the data comes from multiple controllers as illustrated in FIG. 18, which is a schematic diagram of a network of controllers in accordance with an example embodiment.

Figure 18:
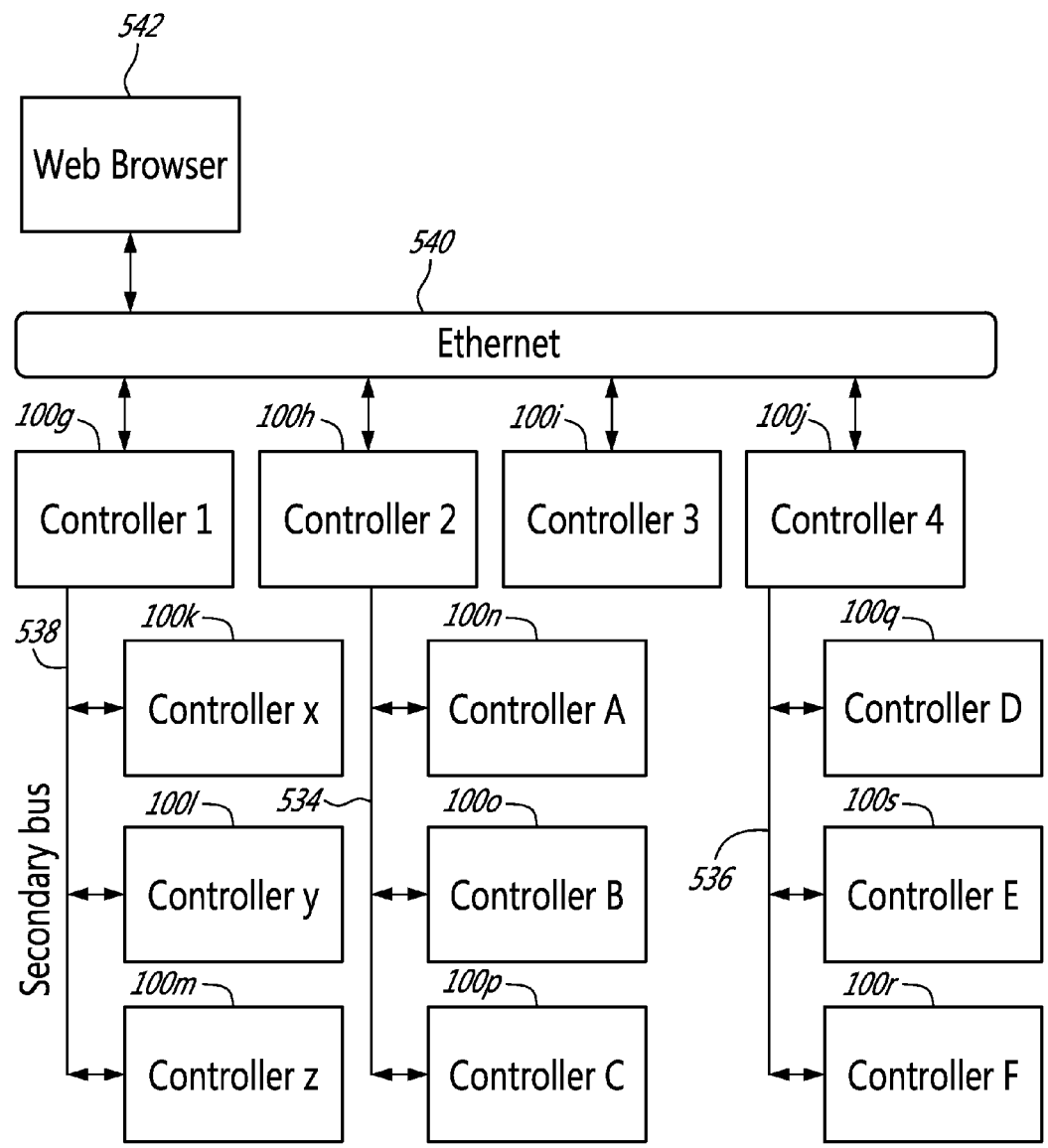
FIG. 18 is a schematic diagram of a network of DCMs in accordance with an example embodiment.

As shown in FIG. 18, DCMs 100g, 100h, 100i, and 100j are gateway control managers. DCMs 100g, 100k, 100l, and 100m are arranged in a cluster, where DCM 100g is a cluster control manager. DCMs 100h, 100n, 100o, and 100p are arranged in a cluster, where DCM 100h is a cluster control manager. DCMs 100j, 100q, 100s, and 100r are arranged in a cluster, where DCM 100j is a cluster control manager.

When the web browser 542 connects first to DCM 100g via Ethernet bus 540, the application and any data residing in the local database on DCM 100g is downloaded in the web browser's memory and executed locally on the computer where the browser is running.

After that, the application operates on its local copy of the data without any interaction with the DCMs 100 in formulating information and action requests.

There may be 3 ways to get values from other controllers. As a first example, objects in the local databases from DCM 100K, DCM 100*l*, and DCM 100*m* may be stored in the local database of DCM 100*g*, which is acting as a gateway control manager, with a connection to web browser 542 via Ethernet interface 540. As another example, DCM 100*g* can act as a router to DCM 100*h*, which acts as a gateway controller to DCM 100*n*, DCM 100*o*, and DCM 100*p*, As a further example, cross-site HTTP requests can be use to retrieve data from other DMCs by the web browser. Cross-site HTTP requests are HTTP requests for resources from a different domain than the domain of the resource making the request.

A decentralized system may increase redundancy as there is no single point of failure and improve scalability as the control network is deployed in a step wise approach. A decentralized system reduces upfront costs associated with a centralised system as it does not require a centralized server, software, etc. In this sense, "centralized" management of a single room could be achieve by connecting a CAN2GO connector to a LAN. Adding additional rooms would have marginal costs. With traditional systems, this would be infeasible as the size of the deployment and the hardware/software requirements would need to be planned out in advance. By reducing the upfront costs, a decentralized system reduces the cost of a deployment and thus maximizes the return on investment for a customer.

Embodiments of the present invention provide a DMC 100 comprising at least one communication interface configured to provide a communication link to one or more digital control managers, one or more end devices, and a web browser. The DMC 100 further comprises a local database comprising objects and an embedded software interface to configure and monitor the digital control manager and end devices in communication therewith.

The at least one communication interface may comprise a first transceiver configured to provide one or more wireless communication links to one or more end devices having no active power source. The at least one communication interface may comprise a second transceiver configured to provide one or more wireless communication links to one or more digital control managers and one or more end devices. The at least one communication interface may comprise an Ethernet interface configured to provide one or more wired communication links and one or more wireless communications links to one or more digital control managers and/or one or more end devices. The at least one communication interface may comprise a WiFi transceiver to provide one or more wireless communications links to one or more digital control managers and/or one or more end devices. As noted above, the DMC 100 may further comprise an intellectualize function module configured to execute a computer program to provide intelligence to the digital control manager and to end devices in communication therewith. The DMC 100 may further comprise a sharing kernel configured to manage the local database, a communication function module configured to provide an interface for converting from a plurality of protocols to a plurality of protocols using corresponding protocol stacks and drivers, a control function module configured to manage input and output interfaces and further configured to control physical parameters through a set of control strategies. The sharing kernel configured to provide a common data exchange scheme to link components of the digital control manager via communication channels.

Figure 19:
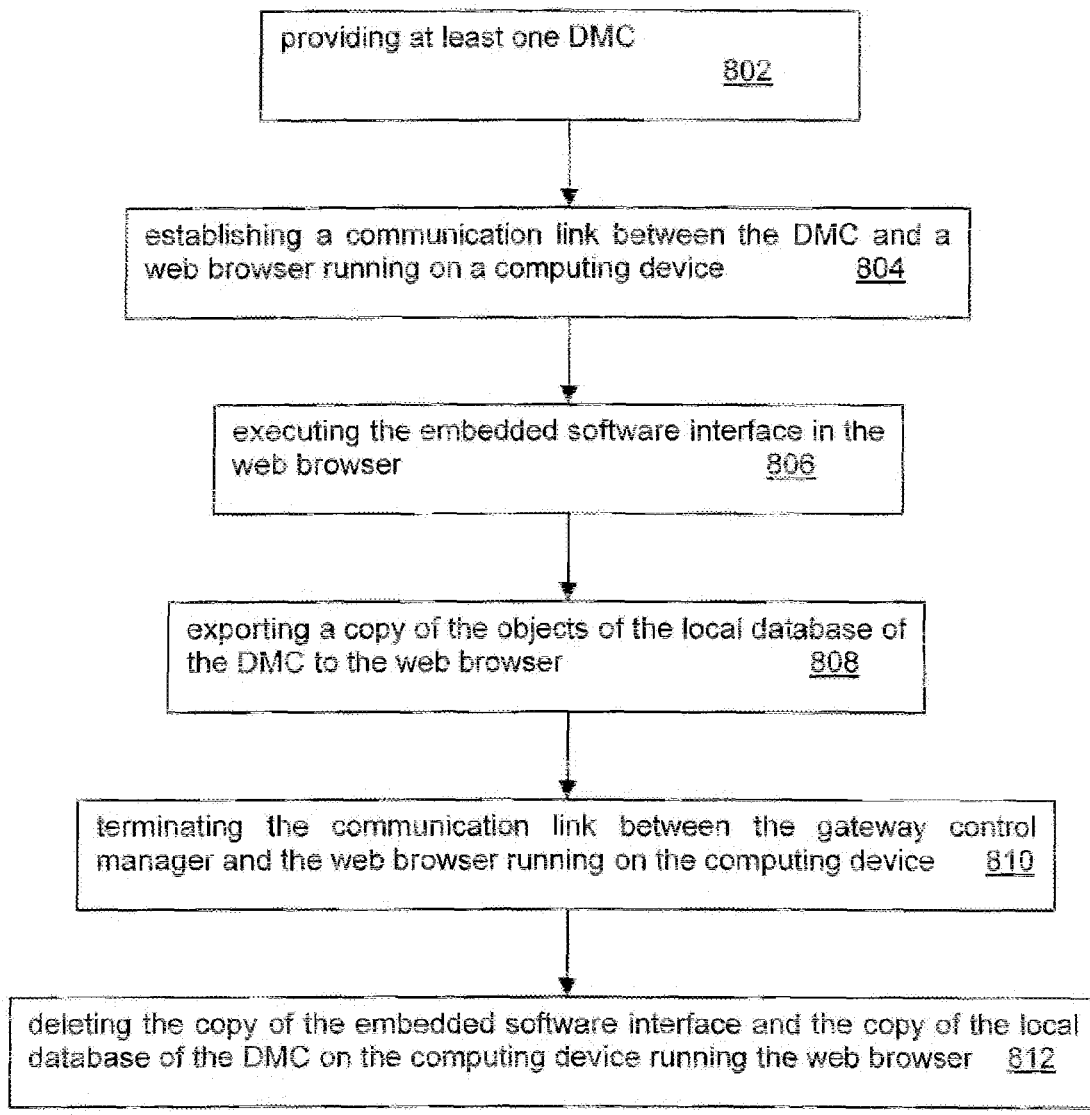
FIG. 19 is a flowchart diagram of a method for synchronizing a local database in accordance with an example embodiment and FIG. 20 is a flowchart diagram of a method for synchronizing a local database in accordance with another example embodiment.

Referring now to FIG. 19, there is shown a flowchart diagram of a method 800 for synchronizing a local database in accordance with an example embodiment.

Step 802 comprises providing at least one DMC 100 to the system.

Step 804 comprises establishing a communication link between the DMC 100 and a web browser running on a computing device. The web browser may be running on a remote computer of a contractor that will be configuring the system.

Step 806 comprises executing the embedded software interface in the web browser. This enables the remote computer to access the DMC 100 for configuration.

Step 808 comprises exporting a copy of the objects of the local database of the DMC 100 to the web browser. In effect, the web browser can act as another node or DMC 100 in the network as it contains a copy of the local database.

Optionally, step 810 comprises terminating the communication link between the gateway control manager and the web browser running on the computing device.

Figure 20:
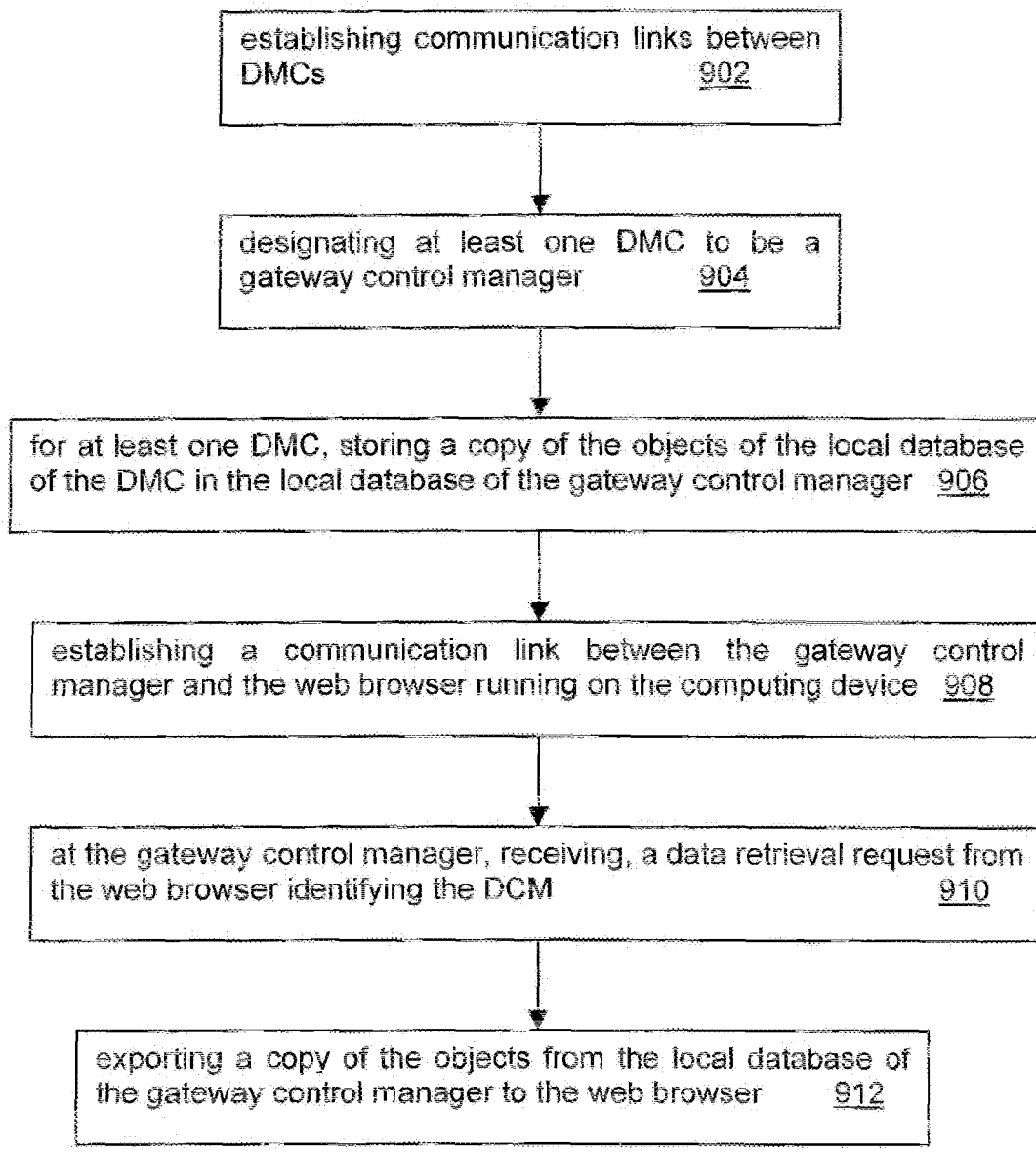

Optionally, step 812 comprises deleting the copy of the web interface application and the copy of the local database of the gateway control manager on the computing device running the web browser. This ensures that there are no outdated copies of the local database, Referring now to FIG. 20, there is shown a flowchart diagram of a method 900 for synchronizing a local database in accordance with another example embodiment.

Step 902 comprises establishing communication links between a plurality of DMCs 100.

Step 904 comprises designating at least one of the DMCs 100 to be a gateway control manager.

Step 906 comprises, for at least one DMCs 100, storing a copy of the objects of the local database of the at least one DMCs 100 in the local database of the gateway control manager.

Step 908 comprises establishing a communication link between the gateway control manager and the web browser running on the computing device.

Step 910 comprises, at the gateway control manager, receiving, a data retrieval request from the web browser identifying the at least one digital control manager;

Step 912 comprises exporting a copy of the objects from the local database of the gateway control manager to the web browser. Exporting the copy of the objects from the local database of the gateway control manager to the web browser may use a cross-site HTTP request.

The method 900 may comprise providing the embedded software interface in the memory of the gateway control manager and exporting a copy of the web interface application and a copy of the local database of the gateway control manager to the computing device running the web browser. When the communication link between the gateway control manager and the web browser running on the computing device is terminated, the method 900 may comprise deleting the copy of the web interface application and the copy of the local database of the gateway control manager on the computing device running the web browser.

Although the present invention has been described by way of particular embodiments and examples thereof, it should be noted that it will be apparent to persons skilled in the art that modifications may be applied to the present particular embodiment without departing from the scope of the present invention.

We claim:

1. A digital control manager comprising:
   a first transceiver configured to provide one or more wireless communication links to one or more energy autonomous end devices;
   a second transceiver configured to provide one or more wireless communication links to one or more digital control managers;

a local database;

an intellectualize function module configured to execute a computer program to provide intelligence to the digital control manager and to end devices in communication therewith, the providing of intelligence comprising analyzing data and generating a next command; and a sharing kernel configured to manage a local database of objects and provide data sharing between networked digital control managers, the sharing kernel upon determining that an object is updated, synchronizing the local database of a gateway control manager by making a corresponding update to a copy stored in the gateway control manager of the object that was updated.

2. The digital control manager of claim 1 further comprising an Ethernet interface configured to provide one or more wired communication links and one or more wireless communications links to one or more digital control managers and one or more end devices.

3. The digital control manager of claim 1 further comprising a WiFi transceiver to provide one or more wireless communications links to one or more digital control managers and one or more end devices.

4. The digital control manager of claim 1 further comprising an embedded software interface to configure and monitor the digital control manager and end devices in communication therewith.

5. The digital control manager of claim 1 further comprising a communication function module configured to convert from a plurality of protocols to a plurality of protocols using corresponding protocol stacks and drivers.

6. The digital control manager of claim 1 further comprising a control function module configured to manage input and output interfaces and further configured to control physical parameters through a set of control strategies.

7. The digital control manager of claim 1 further comprising a sharing kernel configured to provide a common data exchange scheme to link components of the digital control manager via communication channels.

8. The digital control manager of claim 1 further comprising an actuator and a sensor.

9. The digital control manager of claim 1 further comprising a pressure sensor.

10. A digital control manager system comprising:
a plurality of digital control managers as in claim 1;
a network of communication links between the digital control managers to enable data exchange between the digital control managers;
a plurality of end devices, wherein each end device is in communication with at least one digital control manager by a communication link to enable data exchange between the end device and the at least one digital control manager; and
at least one distributed database comprising a copy of the objects of the local databases of at least some of the digital control managers.

11. The digital control manager of claim 1, wherein if there are not updates, then no data is transmitted to the gateway control manager.

12. The digital control manager of claim 1, further comprising a communication function module configured to convert from a plurality of protocols to a plurality of protocols using corresponding protocol stacks and drivers.

13. A database management method for a low bit rate communication network comprising:
establishing communication links between a plurality of digital control managers and a plurality of end devices, wherein each digital control manager comprises a local database of objects;
designating at least one of the digital control managers to be a gateway control manager;

for at least one digital control manager, storing a copy of the objects of the local database of the at least one digital control manager in the local database of the gateway control manager;
determining whether an object of the local database of the at least one digital control manager is updated;
upon determining that an object is updated, synchronizing the local database of the gateway control manager by making a corresponding update to the copy of the object that was updated.

14. The database management method of claim 13 further comprising:
establishing a communication link between the gateway control manager and a web browser;
receiving a data request from the web browser at the gateway control manager;
providing the web browser with access to the local database of the gateway control manager.

15. The database management method of claim 14, wherein providing access comprises exporting a copy of the local database of the gateway control manager to the web browser.

16. The database management method of claim 15, wherein the gateway control manager has network access to an external device.

17. The database management method of claim 14, wherein synchronizing the local database comprises only transmitting the update to the object.

18. The database management method of claim 14, wherein the gateway control manager is designated as a first gateway control manager, the method further comprising:
designating one of the digital control managers to be a second gateway control manager;
for at least one other digital control manager, storing a copy of the objects of the local database of the at least one other digital control manager in the local database of the second gateway control manager;
storing a copy of the objects of the local database of the first gateway control manager in the local database of the second gateway control manager;
determining whether an object of the local database of the first gateway control manager is updated; and
upon determining that an object is updated, synchronizing the local database of the second gateway control manager by making a corresponding update to the copy of the object that was updated.

19. The database management method of claim 18, wherein the first gateway control is configured to communicate with an external device and provide the external device with a copy of the objects of its local database; and
wherein the second gateway control manager is configured to communicate with an external device and provide the external device with a copy of the objects of the local database of the first gateway control manager.

20. The database management method of claim 18, further comprising:
grouping the digital control managers into clusters, wherein each cluster is assigned to manage a floor or segment of a building; and
wherein each end device is in communication with at least one digital control manager by either wireless or wired communication link to enable data exchange between the end device and the digital control manager.

* * * * *